United States Patent [19]

Majima et al.

[11] Patent Number: 5,594,577
[45] Date of Patent: Jan. 14, 1997

[54] OPTICAL RECEIVER AND OPTICAL TRANSMISSION SYSTEM USING THE RECEIVER

[75] Inventors: Masao Majima, Isehara; Toshihiko Ouchi, Machida; Takeo Ono, Sagamihara, all of Japan

[73] Assignee: Canon Kabushiki Kaisha, Tokyo, Japan

[21] Appl. No.: 492,964

[22] Filed: Jun. 21, 1995

Related U.S. Application Data

[63] Continuation of Ser. No. 127,344, Sep. 28, 1993, abandoned.

[30] Foreign Application Priority Data

Oct. 3, 1992 [JP] Japan ................... 4-289552
Sep. 9, 1993 [JP] Japan ................... 5-248659

[51] Int. Cl.$^6$ .......... H04J 14/02; H04B 10/00; H04B 10/06
[52] U.S. Cl. .......... 359/124; 359/189; 359/154
[58] Field of Search .......... 359/124, 125, 359/133, 134, 156, 190, 191, 192, 194, 195; 370/12, 18, 122

[56] References Cited

U.S. PATENT DOCUMENTS

| | | | |
|---|---|---|---|
| 4,989,199 | 1/1991 | Rzeszewski | 370/1 |
| 5,020,153 | 5/1991 | Choa et al. | 372/96 |
| 5,023,950 | 6/1991 | Tsushima et al. | 359/154 |
| 5,077,816 | 12/1991 | Glomb et al. | 385/37 |
| 5,105,295 | 4/1992 | O'Byrne | 359/191 |
| 5,170,402 | 12/1992 | Ogita et al. | 372/20 |
| 5,247,382 | 9/1993 | Suzuki | 359/156 |
| 5,274,490 | 12/1993 | Tsushima et al. | 359/191 |
| 5,299,045 | 3/1994 | Sekiguchi | 359/130 |
| 5,305,134 | 4/1994 | Tsushima et al. | 359/192 |
| 5,408,349 | 4/1995 | Tsushima et al. | 359/124 |

FOREIGN PATENT DOCUMENTS

| | | |
|---|---|---|
| 0272384 | 6/1988 | European Pat. Off. |
| 0284910 | 10/1988 | European Pat. Off. |
| 2096719 | 6/1990 | Japan |

OTHER PUBLICATIONS

T. L. Koch, et al., "InP-Based Photonic integrated circuits", pp. 139–147, vol. 138, No. 2, Apr. 1991, Stevenage GB, IEE Proceedings J. Optoelectronics.

H. Toba et al., "A 100-Channel Optical FDM Transmission/Distribution at 622 Mb/s over 50 km", pp. 1396–1401, vol. 8, No. 9, Journal of Lightwave Technology, Sep. 1990.

G. Jacobsen, "Preamplifier Implementation of ASK and Limiter-Discriminator FSK Systems", pp. 1359–1361, vol. 28, No. 14, Electronics Letter, Stevenage GB, Jul. 2, 1992.

Hiromu Toda, et al., "A 100-Channel Optical FDM Transmission/Distribution System", vol. 89, No. 459, OCS 89-64, (NTT Transmission Systems Labs. and NTT Opto-Electronics Labs.), Mar. 16, 1992.

(List continued on next page.)

*Primary Examiner*—Hezron E. Williams
*Assistant Examiner*—Richard A. Moller
*Attorney, Agent, or Firm*—Fitzpatrick, Cella, Harper & Scinto

[57] ABSTRACT

In an optical receiver of the present invention, an optical signal is split into at least two light portions, and the light portions are respectively received by at least two tunable optical filters. The tunable optical filters are respectively capable of changing their transmission wavelengths. Transmitted lights through the tunable optical filters are received by at least two light receiving elements. The light receiving elements respectively supply outputs. A differential amplifier produces a difference signal from the outputs of the light receiving elements. In an optical FDM-FSK transmission system using the optical receiver, an optical FSK signal is received by utilizing the difference signal. The tracking operation of the tunable optical filters, whose object includes, for example, at least a center optical frequency of the tunable filters, can be readily performed.

25 Claims, 23 Drawing Sheets

OTHER PUBLICATIONS

T. Numai, et al., "Semiconductor Tunable Wavelength Filters", vol. 88, No. 239, OQE 88–65, (Opto–Electronics Res. Labs., C&C Systems Res. Labs., NEC Corporation), Oct. 24, 1988.

I. P. Kaminow et al., Journal of Lightwave Technology, FDMA–FSK Star Network with a Tunable Optical Filter Demultiplexer, vol. 6, No. 9, Sep., pp. 1406–1414, 1988.

Prucnal, Journal of Optical Communication, Wideband FSK Optical Fiber Communication Experiment, vol. 4, Sep., pp. 99–103, 1983.

T. Numai et al., Semiconductor Tunable Wavelength Filter, OQE 88–65, 1988.

OPTICAL FREQUENCY CHARACTERISTICS OF
TUNABLE FILTER IN OPTICAL FSK RECEIVER

OPTICAL FREQUENCY CHARACTERISTICS
OF TUNABLE FILTER

LIGHT SIGNAL

**OPTICAL SIGNAL SPECTRA OF OPTICAL
FDM-FSK TRANSMISSOPN**

RELATIONSHIP BETWEEN
CENTER OPTICAL
FREQUENCY OF OPTICAL
FSK RECEIVER AND
ERROR SIGNAL

RELATION BETWEEN OPTICAL FREQUENCY
INTERVAL AND OUTPUT OF LPF

RELATION BETWEEN OPTICAL FREQUENCY
INTERVAL AND ERROR SIGNAL

RELATION BETWEEN CENTER OPTICAL
FREQUENCY AND OUTPUT OF LPF 15-3

RELATION BETWEEN CENTER OPTICAL
FREQUENCY AND ERROR SIGNAL

RELATION BETWEEN OPTICAL FREQUENCY
INTERVAL AND OUTPUT OF LPF

RELATION BETWEEN OPTICAL FREQUENCY
INTERVAL AND ERROR SIGNAL

OPTICAL RECEIVER AND OPTICAL TRANSMISSION SYSTEM USING THE RECEIVER

This application is a continuation, of application Ser. No. 08/127,344, filed Sep. 28, 1993, now abandoned.

BACKGROUND OF THE INVENTION

1. Field of the Invention

The present invention relates to an optical receiver and an optical transmission system using the optical receiver. In particular, the present invention relates to an optical frequency shift keying (FSK) receiver to be used in an optical frequency division multiplexing (FDM)-FSK transmission system, and an optical FDM-FSK transmission system using the optical FSK receiver.

RELATED BACKGROUND ART

In an optical FDM transmission system, a high-density multiplexing of transmitted signals is conducted at optical frequency intervals of several GHz-several tens GHz. Further, a wide band property of optical fibers can be effectively utilized, and a large number of independent high-speed channels can be established in an optical fiber. Incidently, wavelength division multiplexing (WDM) systems multiplex transmitted signals at relatively wide wavelength intervals, compared with the FDM systems. A communication system having a large capacity and a flexible network structure can be attained by the optical FDM transmission system, and such a FDM transmission system is expected to be applied to optical cable television (CATV) networks and multi-media optical local area networks (LANs).

In the FDM system, a demodulation system is an important subject to be considered in order to achieve a simple system with a large multiplicity. Presently, the external intensity modulation and direct FSK modulation have been chiefly studied as a modulation system, and the optical filter-direct detection and optical heterodyne detection have been vigorously developed as a demodulation system.

The direct FSK modulation of those modulation systems can be readily implemented by superimposing a modulation current with an amplitude of an order of mA on a bias current of a distributed feedback laser diode (DFB-LD). Mark and space optical frequencies (hereinafter also referred to as fm and fs, respectively, and a frequency interval therebetween is an order of GHz) of that optical FSK signal respectively correspond to "1" and "0" of data signal. Since two optical frequencies are used per one channel, the direct FSK modulation is inferior to the external intensity modulation in the multiplicity of signals. However, since the FSK modulation never necessitates an external modulator, the FSK modulation is highly superior to the external intensity modulation in the structural simplicity.

On the other hand, in the optical filter-direct detection of those demodulation systems, the wavelength of a receiving channel (a desirable channel) is selected from the multiplexed wavelengths of signals by using an optical filter, and the selected signal or desirable signal is detected by a photodetector (PHD) circuit or light receiving circuit. When such a demodulation system is utilized in the FSK modulation system, the separation of fm and fs is also performed by the optical filter. Although such a demodulation system is inferior to the optical heterodyne detection system in receiving sensitivity, the optical filter-direct detection system is advantageous in several points, such as structural simplicity, a band range treated in electric circuit and the fact that a local oscillator or LD is not necessitated.

As is seen from the foregoing, a transmission system of combined direct FSK modulation and optical filter-direct detection is superior to the other systems in simplicity, and thus can be said to be a most expected optical FDM transmission system to be realized at the earliest stage. In this specification, an optical FDM transmission using FSK modulation is referred to as optical FDM-FSK transmission system, and a receiver (a combination of an optical filter, a light receiving circuit and the like) in such a transmission system is referred to as an optical FSK receiver.

The optical FDM-FSK transmission system will be described. FIG. 8 shows optical signal spectra of the optical FDM-FSK transmission system. A set of mark optical frequency (fim of f1m~fnm) and space optical frequency (fis of f1s~fns) is assigned to one channel. The optical FSK receiver is a key device in the optical FDM-FSK transmission system, and hence a receiver, in which a receiving optical frequency is changeable or tunable, has been researched and developed. The type of optical FSK receivers can be classified into several kinds in terms of types of tunable filters and receiving systems of optical FSK signals.

Fabry-Perot type, semiconductor type and Max-Zehnder type filters are known as a tunable filter usable for the optical FDM transmission whose channel interval is in a range from several GHz to several tens of GHz. The Fabry-Perot type filter is one in which the finesse of an ordinary Fabry-Perot resonator is enhanced and a free spectral range thereof is widened to be operated as a tunable filter. Its selection optical frequency is controlled by changing the optical length of the resonator mechanically or by electro-optic effect. The semiconducotr type filter is one in which a laser, such as DFB-LD, DBR (distributed bragg reflector)-LD and the like, is used with its injection current being set below its threshold. This type operates as a current control type tunable filter whose selection optical frequency is changed by changing the injection current. The Max-Zehnder type filter is one in which Max-Zehnder filters or periodic filters are connected in a cascade manner (a period at a succeeding stage is set to a half of that at a precedent stage), and an optical frequency of a receiving channel is selected from the frequency multiplexed optical signals. The selection optical frequency can be varied by controlling the optical length at each stage and inverting the transmission characteristics thereof.

The Fabry-Perot type and semiconductor type filters operate as a band pass filter. As a result, when receiving the FSK signal, the optical frequency of the tunable filter is tuned to one of fm and fs. In contrast, in the Max-Zehnder type filter, optical frequencies of two output ports at the last stage in the Max-Zehnder filter are respectively tuned to fm and fs.

Two prior art optical FSK receivers will be described hereinbelow.

One is a Fabry-Perot type or semiconductor type used as a tunable filter. FIG. 1 is a block diagram of that example, and FIG. 2 illustrates optical frequency characteristics of such a tunable filter. A system, in which a Fabry-Perot type tunable filter using an optical fiber is employed, is disclosed in I. P. Kaminow et al. "FDMA-FSK star network with a tunable optical filter demultiplexer", Journal of Lightwave Technology, vol. 6, No. 9. pp. 1406–1414 (1988).

In FIG. 1, a tunable filter 110-1 transmits only fm of a receiving channel of optical signals, a light receiving or photodetector (PHD) circuit 110-3 converts the transmitted signal to an electric signal and a discrimination circuit 110-5 regenerates a digital signal from the electric signal. An optical frequency control circuit 110-4 controls the transmission optical frequency of the tunable filter 110-1 through a driver 110-2, based on the output from the light receiving circuit 110-3. A communication control system in a receiver apparatus controls the optical frequency control circuit 110-4 (for example, with respect of the designation of a receiving channel). In the structure, when a second channel, for example, is to be received, the optical frequency of the tunable filter 110-1 is tuned to a mark frequency f2m of the second channel, as shown in FIG. 2. Thereby, the optical FSK signal of the second channel is converted to an amplitude shift keying (ASK) signal.

A second example is an example which utilizes a Max-Zehnder type filter as a tunable filter. FIG. 3 shows a block diagram of the second example, and FIG. 4 illustrates optical frequency characteristics of an optical frequency discriminator 112-2. In this example, an optical frequency selection switch 112-1 represents a cascade-structure Max-Zehnder filter without the last stage, and an optical frequency discriminator 112-2 represents the last stage thereof. The number of channels amount to the k-th power of 2 when the number of stages of the Max-Zehnder filter in the optical frequency selection switch 112-1 is k. The second example is discussed in Toba et al. "A study of method for constructing 100-channel optical FDM data delivery transmission system", Electronics Information Communication Academy of Japan, Techniques Search Report OCS 89-64, pp. 15–24 (1989).

In FIG. 3, the optical frequency selection switch 112-1 includes a signal port and monitor ports whose number is the same as that of stages. The signal port is built by connecting an output port at each stage of the Max-Zehnder filter to a succeeding stage, and is connected to the optical ferquency discriminator 112-2. On the other hand, the monitor port is the other output port at each stage, and each connected to the light receiving circuit 112-4-3. The optical frequency switch 112-1 transmits only optical frequencies fm and fs of a receiving channel of the optical signals. The optical frequency discriminator 112-2 separates fm and fs from each other, and they are respectively converted to electric signals by light receiving circuits 112-4-1 and 112-4-2. A differential amplifier 112-6 produces a difference signal between those electric signals, and its output is regenerated as a digital signal by a discrimination circuit 112-7. On the other hand, a optical frequency control circuit 112-5-1 controls the optical frequency discriminator 112-2 through a driver 12-3-1, with the output of the differential amplifier 12-6 being used as an error signal. The control circuit 112-5-1 is ON-OFF controlled by a communication control system in a receiver apparatus, and is caused to be ON only at the time of a tracking operation.

Further, light receiving circuit 112-4-3, optical frequency control circuit 112-5-2 and driver 112-3-2 have inputs and outputs whose number is the same as that of stages of the Max-Zehnder filter in the optical frequency selection switch 112-1. Light signal of the monitor port at each stage is converted to an electric signal by the light receiving circuit 112-4-3, and the electric signal is input into the frequency control circuit 112-5-2. The optical frequency control circuit 112-5-2 controls the Max-Zehnder filter at each stage of the optical frequency selection switch 112-1 through the driver 112-3-2. The control circuit 112-5-2 itself is controlled by the communication control system in the receiver apparatus. At the time of channel selection, each stage is set so that the optical frequency of the receiving channel is output into the signal port at each stage. Then, received signal and output of each monitor port are synchronously detected to produce an error signal, and the tracking is performed at each stage so that the optical frequency of the receiving channel is minimized at each monitor port.

In the structure of FIG. 3, when, for example, the second channel is to be received, a center value between optical frequencies at two output ports of the optical frequency discriminator 112-2 is tuned to a center value between f2m and f2s of the second channel. Thereby, the optical FSK signal of the second channel is converted to an amplitude shift keying (ASK) signal. In the second example, different from the first example, both of mark and space signals can be received.

Additionally, in a prior art experimental system of optical FSK transmission, an optical FSK signal, which has an interval of an order nm between mark and space optical frequencies, is received by fixed-wavelength optical filters whose transmission optical frequencies are respectively accorded with those optical frequencies. In such a system, however, optical frequencies are fixed and the optical frequency interval is relatively wide, and therefore, that system is not suitable for currently developed multi-channel optical FDM-FSK transmission system. An example of that experimental system is disclosed in Paul R. Prucnal "Wideband FSK optical fiber communication experiment", Journal of Optical Communications, vol. 4, No. 3, pp. 99–103 (1983).

The prior art optical FSK receivers, however, have the following problems.

Initially, the problem of wavelength tracking exists in the first prior art example. As a general tracking method, a low frequency (relative to that of the band of a transmission signal) modulation of transmission signal and a synchronous detection are used. By using that method, the tunable optical filter 110-1 is controlled so that the transmission light intensity of the tunable optical filter 110-1 is maximized. Thus, the transmission optical frequency of the tunable filter 110-1 can be traced or tracked to the optical frequency of a light source of the receiving channel. That system is disclosed in Japanese Patent Application No. 4-192900 filed by the same assignee.

In the band of a control system of that method, both of fm and fs of the optical FSK signal look as if they were always oscillated. In other words, signals of fm and fs are present at the same ratio in any given period in the optical FSK signal, and in the control system of that system in a low band, an optical FSK signal in a relatively high band is treated with being averaged. Therefore, both of fm and fs look as if being always radiated. Further, in the optical FDM-FSK transmission, in order to increase the multiplicity of signals, an optical frequency deviation (a difference between fm and fs) of each channel is set at a value which is equal to approximately a half width of the optical filter 110-1 (see FIG. 2). As a result, a prominent peak of the transmission light intensity of the tunable filter 110-1 cannot be obtained at fm, and hence the tracking by that method is difficult to achieve.

Further, in the second prior art example, complexities of the structure and control are problems as shown in FIG. 3. That is, the filter means has a multi-stage structure, and each stage has to be controlled independently.

SUMMARY OF THE INVENTION

It is an object of the present invention to provide an optical receiver, such as an optical FSK receiver for use in an optical FDM-FSK transmission system, and an optical transmission system using the optical receiver.

The object of the present invention is achieved by the following optical receivers and optical communication systems.

According to one aspect of the present invention, an optical receiver is provided which comprises light splitting means for splitting an optical signal into at least two light portions, at least two tunable optical filters, at least two light receiving means for receiving lights from the filters, respectively, and a differential amplifier for producing a difference signal from outputs of the light receiving means. The filters respectively receive the light portions from the light splitting means and are respectively capable of changing their transmission wavelengths.

According to another aspect of the present invention, an optical frequency shift keying (FSK) receiver for use in an optical frequency division multiplexing (FDM)-FSK transmission system is provided, which comprises light splitting means for splitting an optical FSK signal into at least two light portions, at least two tunable optical filters, at least two light receiving means for receiving lights from the filters, respectively, and a differential amplifier for producing a difference signal from the outputs of the light receiving means. The filters respectively receive the light portions from the light splitting means and are respectively capable of changing their transmission wavelengths. Mark and space optical frequencies of the optical FSK signal split by the light splitting means are respectively transmitted through the tunable optical filters whose transmission wavelengths are respectively tuned to the mark and space optical frequencies. The transmitted mark and space optical frequencies are independently received by the light receiving means and the optical FSK signal is received by using the difference signal produced by the differential amplifier.

An optical frequency shift keying (FSK) receiver mentioned above may further comprise optical frequency control means and an optical frequency control Circuit. The optical frequency control circuit includes a low pass filter for producing a low frequency component of the difference signal and a circuit for controlling the optical frequency control means based on the low frequency component. A center optical frequency of said tunable optical filters is tracked to a center optical frequency of the received optical FSK signal by the optical frequency control means using the low frequency component as an error signal.

An optical frequency shift keying (FSK) receiver mentioned above may further comprise optical frequency control means and an optical frequency control circuit. The optical frequency control circuit includes an adder for producing a sum signal of the outputs of the light receiving means, a reference voltage source for supplying a reference voltage, a first low pass filter for producing a first low frequency component of the difference signal, a second low pass filter for producing a second low frequency component of the sum signal, a subtracter for producing a difference signal between the second low frequency component and the reference voltage and a circuit for controlling the optical frequency control means. A center optical frequency of the tunable optical filters is tracked or traced to a center frequency frequency of the received optical FSK signal by the optical frequency control means using the first low frequency component as an error signal, and an optical frequency interval of the tunable optical filters is tracked to an optical frequency interval of the received optical FSK signal by the optical frequency control means using the second difference signal as an error signal.

An optical frequency shift keying (FSK) receiver mentioned above may further comprise optical frequency control means and an optical frequency control circuit. The optical frequency control circuit includes an adder for producing a sum signal of the outputs of the light receiving means, at least two modulating means for supplying modulation signals of different frequencies for modulating a center optical frequency and an optical frequency interval of the tunable optical filters, a low pass filter for producing a modulated component of the sum signal, at least two phase detecting means for detecting phase relations between the modulated component and the modulation signals of different frequencies, respectively, and a circuit for controlling the optical frequency control means based on the phase relations. A center optical frequency of the tunable optical filters is tracked to a center frequency of the received optical FSK signal by the optical frequency control means, producing an error signal from the phase relation between the modulated component and the modulation signal of one frequency, and an optical frequency interval of the tunable optical filters is tracked to an optical frequency interval of the received optical FSK signal by the optical frequency control means, producing an error signal from the phase relation between the modulated component and the modulation signal of the other frequency.

An optical frequency shift keying (FSK) receiver mentioned above may further comprise optical frequency control means and an optical frequency control circuit. The optical frequency control circuit includes an adder for producing a sum signal of the outputs of said light receiving means, modulating means for supplying a modulation signal for modulating an optical frequency interval of the tunable optical filters, a low pass filter for producing a low frequency component of the difference signal, a low pass filter for producing a modulated component of the sum signal, phase detecting means for detecting a phase relation between the modulated component and the modulation signal and a circuit for controlling the optical frequency control means. A center optical frequency of the tunable optical filters is tracked to a center frequency of the received optical FSK signal by the optical frequency control means using the low frequency component as an error signal, and an optical frequency interval of the tunable optical filters is tracked to an optical frequency interval of the received optical FSK signal by the optical frequency control means, producing an error signal from the phase relation between the modulated component and the modulation signal.

An optical FDM-FSK transmission system comprises a light transmission line for transmitting a signal therethrough, signal transmitting means for transmitting an optical FSK signal and an optical FSK receiver. The receiver comprises light splitting means for splitting the optical FSK signal into at least two light portions, at least two tunable optical filters, at least two light receiving means for receiving lights from the filters, respectively and a differential amplifier for producing a differential signal from outputs of the light receiving means. The filters respectively receive the light portions from the light splitting means and are respectively capable of changing their transmission wavelengths. The mark and space optical frequencies of the optical FSK signal split by the light splitting means are respectively transmitted through the tunable optical filters whose transmission wavelengths are respectively tuned to the mark and space optical frequencies. The transmitted mark and space optical frequencies are independently received by the light receiving means and the optical FSK signal is received by using the difference signal produced by the differential amplifier.

These advantages and others will be more readily understood in connection with the following detailed description

DESCRIPTION OF THE PREFERRED EMBODIMENTS

First Embodiment

A first embodiment of an optical FSK receiver according to the present invention will be described with reference to FIGS. 5 and 6.

Figure 1:
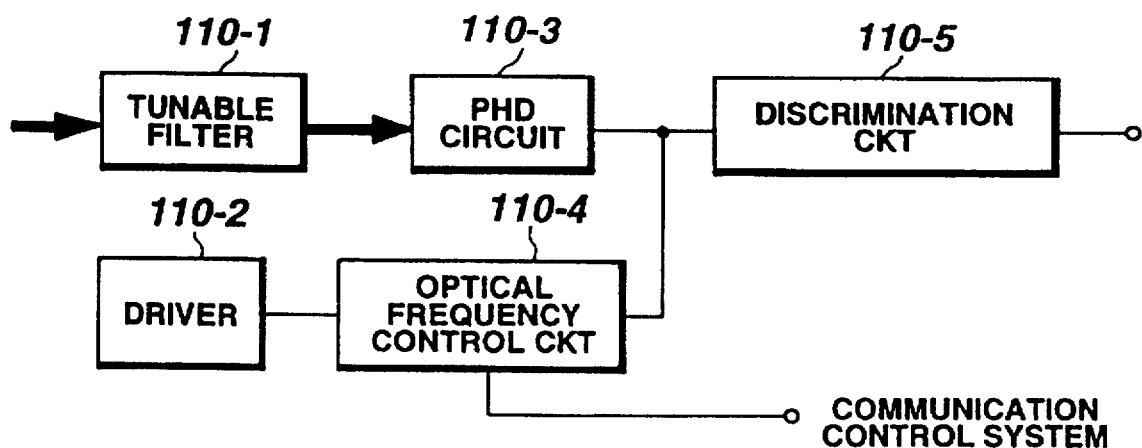
FIG. 1 is a view illustrating a first prior art optical FSK receiver.
Figure 2:
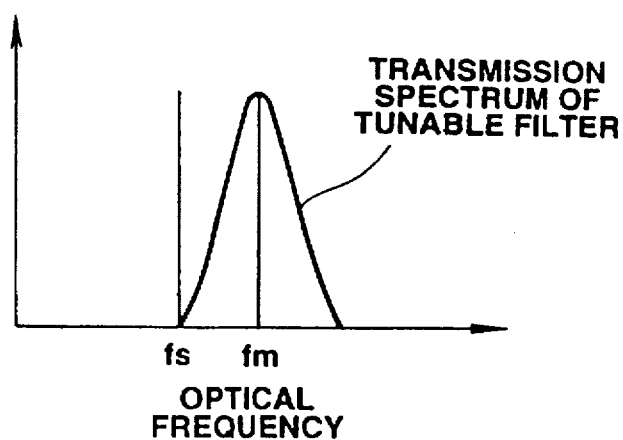
FIG. 2 is a view illustrating optical frequency characteristics of a tunable optical filter of the optical FSK receiver of FIG. 1.
Figure 3:
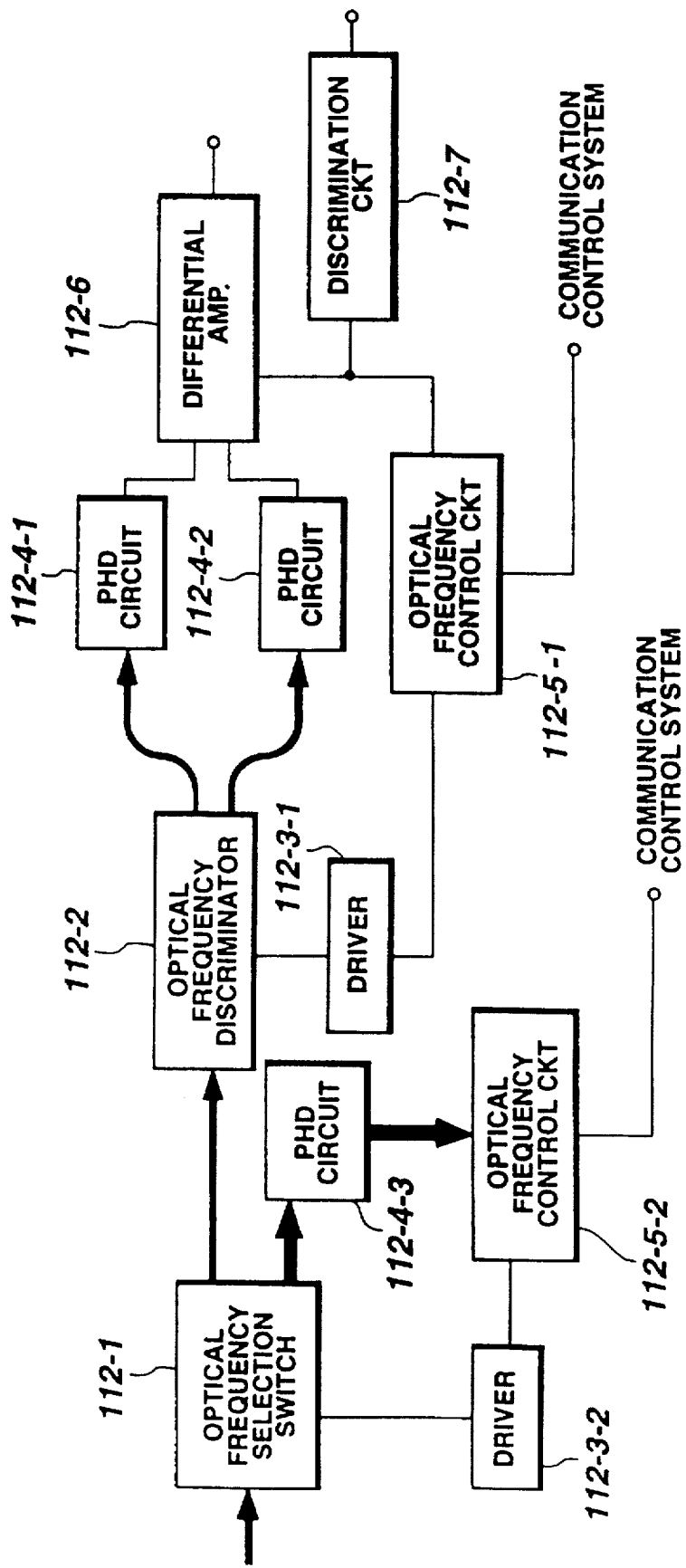
FIG. 3 is a view illustrating a second prior art optical FSK receiver.
Figure 4:
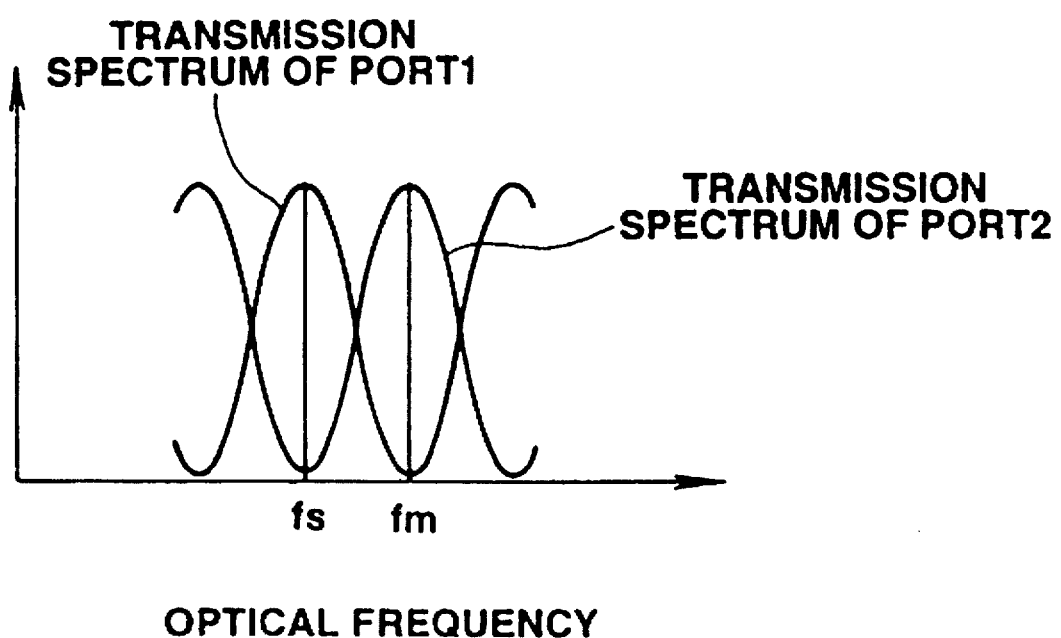
FIG. 4 is a view illustrating optical frequency characteristics of a tunable optical filter of the optical FSK receiver of FIG. 3.
Figure 5:
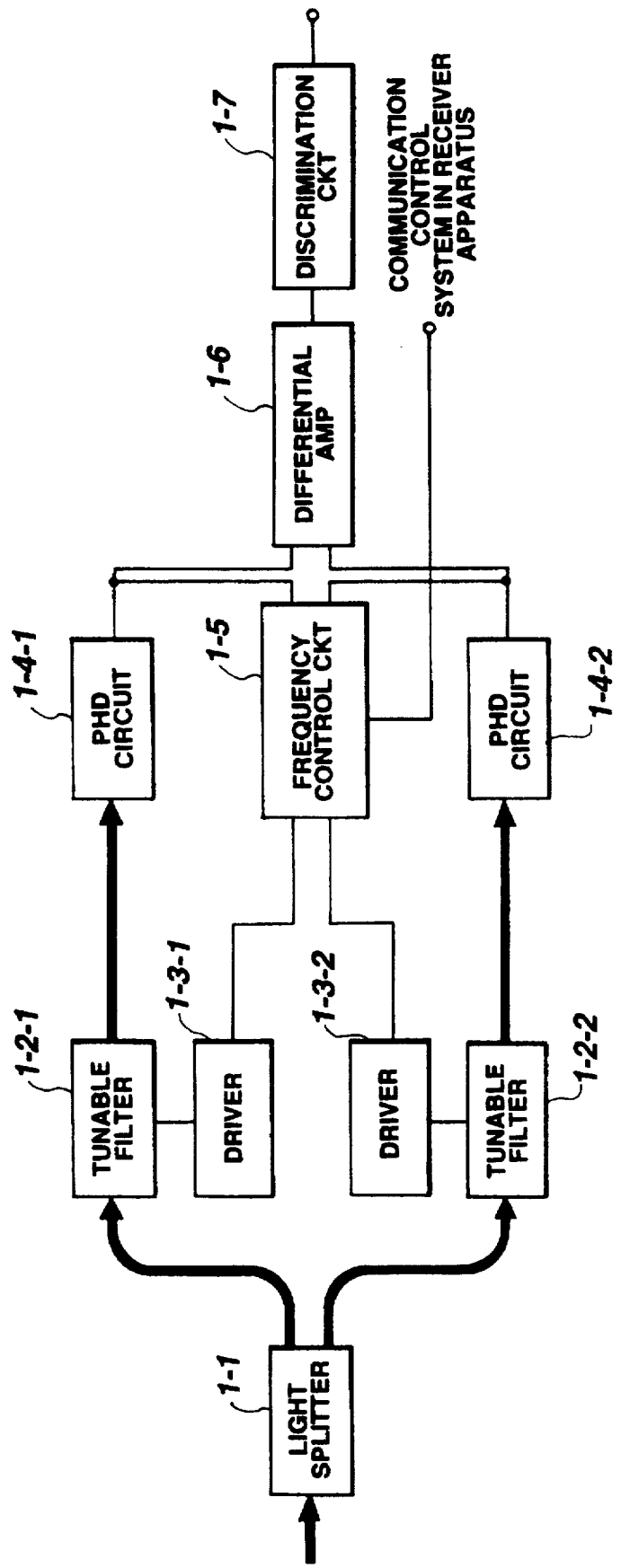
FIG. 5 is a block diagram showing a first embodiment and other embodiments of an optical FSK receiver of the present invention.

In FIG. 5, reference numeral 1-1 is a light splitter or branching device for splitting wavelength-multiplexed light signals transmitted through a light transmission line and directing split signals to two tunable optical filters. Reference numeral 1-2-1 designates a tunable optical filter which is tuned so that only a space optical frequency fs of a receiving channel of light signals is transmitted therethrough, and reference numeral 1-2-2 designates a filter which is tuned so that only a mark optical frequency fm of a receiving channel of light signals is transmitted therethrough. A DFB filter is used as the tunable optical filters 1-2-1 and 1-2-2. The DFB filter is a DFB-LD whose injection current is set below its oscillation threshold. The DFB-LD operates as a current control type tunable optical filter whose peak of a transmission spectrum (also referred to as an optical frequency of an optical filter) can be changed by changing its injection current. The DFB-LD is also provided with a plurality of electrodes to select the optical frequency with its light transmission gain being made constant. Such a DFB-LD is disclosed, for example, in T. Numai et al. "Semiconductor tunable wavelength filter", OQE 88-65 (1988).

Further, reference numerals 1-3-1 and 1-3-2 respectively designate drivers or current sources for injecting current into the tunable filters 1-2-1 and 1-2-2, and reference numerals 1-4-1 and 1-4-2 respectively designate light receiving circuits or photodetector circuits for converting transmitted light of the tunable filters 1-2-1 and 1-2-2 to an electric signal, which are respectively composed of light receiving elements such as photodetectors (PHD) and amplifiers. Reference numeral 1-5 designates an optical frequency control circuit for performing tuning and tracking of a receiving optical frequency of the optical FSK receiver, which is controlled by a communication control system of a receiver apparatus. Reference numeral 1-6 designates a differential amplifier for performing the differential amplification of outputs of the light receiving circuits 1-4-1 and 1-4-2, and reference numeral 1-7 designates a discrimination circuit for regenerating or reproducing a digital signal according to the output of the differential amplifier 1-6.

Figure 6:
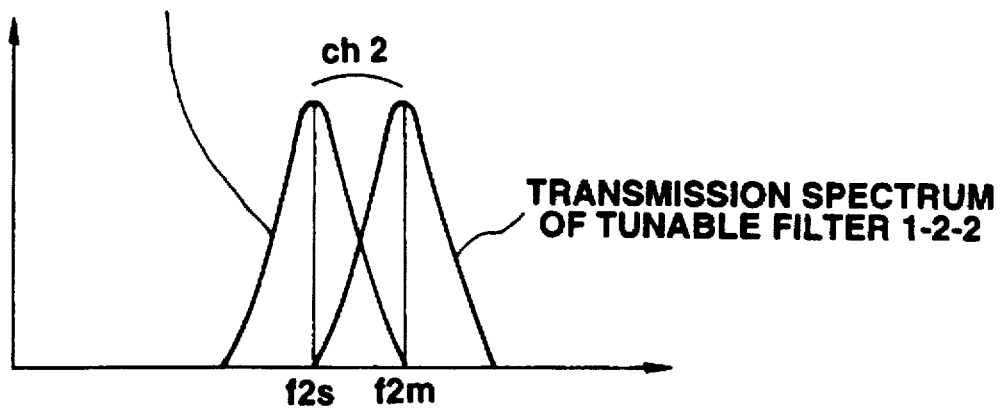
FIG. 6 is a view illustrating optical frequency characteristics of a tunable optical filter of the optical FSK receiver of FIG. 5.

FIG. 6 illustrates optical frequency characteristics of the tunable filters 1-2-1 and 1-2-2 of the optical FSK receiver of the present invention. FIG. 6 shows a situation in which the second channel is received. In FIG. 6, reference symbols f2m and f2s respectively indicate mark frequency and space frequency of the second channel. In order to narrow the optical frequency occupied by one channel without degrading the signal amplitude, a difference between f2m and f2s is set at approximately a half width at half maximum Of the tunable filters 1-2-1 and 1-2-2. The optical frequency of the tunable filter 1-2-1 is tuned to f2s, while the optical frequency of the tunable filter 1-2-2 is tuned to f2m.

Figure 8:
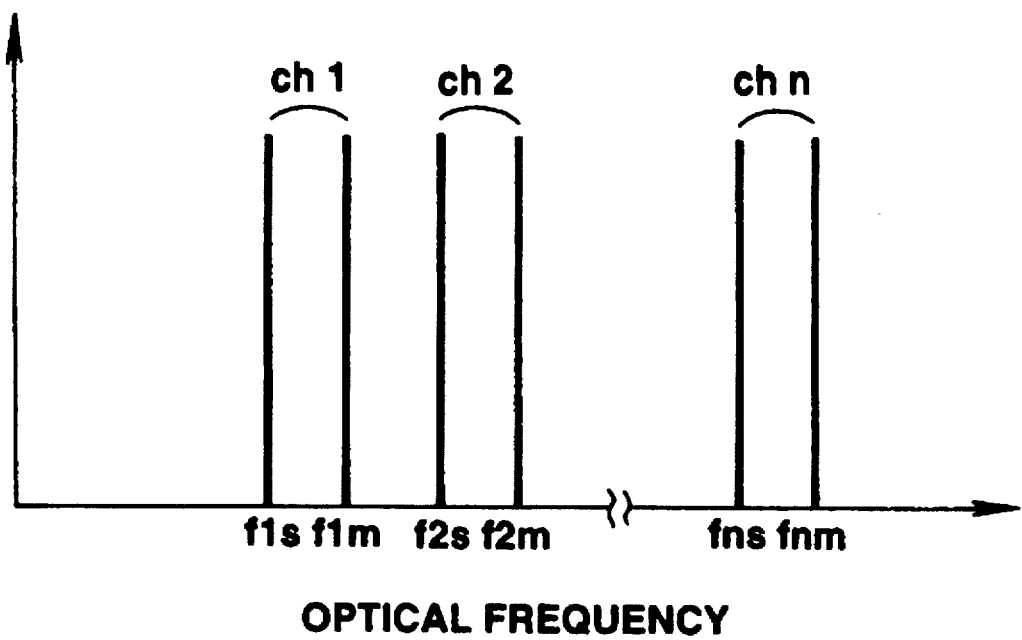
FIG. 8 is a view illustrating optical signal spectra of an optical FDM-FSK transmission.

The receiving principle of optical FSK signal will be described. It is assumed the second channel is received. As shown in FIG. 8, light signals at optical frequencies (f1s, f1m)~(fns, fnm) are incident on the light splitter 1-1. The mark and space frequencies of the same channel, such as f1s and f1m, and fns and fnm, do not exist at the same time for they respectively correspond to "1" and "0" of data signal. Moreover, there is a case where mark and space frequencies fm and fs of a channel, in which no data signal is transmitted, are not present depending on the construction of a communication system.

The optical signal is split by the light splitter 1-1, and the split lights respectively enter the tunable filters 1-2-1 and 1-2-2. Since the second channel is received, the tunable filters 1-2-1 and 1-2-2 are respectively tuned to f2s and f2m. Optical signal enters the light receiving circuit 1-4-1 when data signal of the second channel is "0", and optical signal enters the light receiving circuit 1-4-2 when data signal of the second channel is "1". Since the outputs of the light receiving circuits 1-4-1 and 1-4-2 are respectively connected to negative and positive input terminals of the differential amplifier 1-6, an output of the differential amplifier 1-6 is negative when the data signal of the second channel is "0", and positive when the data signal of the second channel is "1". The discrimination circuit 1-7 discriminates such signal by using zero as a reference, and regenerates data signal.

Tuning and tracking operations of optical frequencies of a receiving channel will be described. The optical frequency control circuit 1-5 controls the tunable filters 1-2-1 and 1-2-2 through the drivers 1-3-1 and 1-3-2 to achieve those operations.

On receiving an instruction from the communication control system that a given channel is to be received, the frequency control circuit 1-5 controls the drivers 1-3-1 and 1-3-2 to scan optical frequencies of the tunable filters 1-2-1 and 1-2-2 and initiates the tuning. During the scanning operation, the difference in optical frequency between the tunable filters 1-2-1 and 1-2-2 remains unchanged at approximately a difference between mark and space optical frequencies. The scanning speed is set at such a value that the communication control system in the receiver apparatus can recognize a channel identification signal contained in data signal reproduced by the discrimination circuit 1-7.

When the optical frequencies of the optical FSK receiver are accorded with the optical frequencies of a receiving channel, a signal is ouput from the discrimination circuit 1-7. When the channel identification signal contained in the reproduced data signal coincides with a channel identification signal to be received, the communication control system in the receiver apparatus supplies a tuning stop signal to the frequency control circuit 1-5. Upon receiving the tuning stop signal, the frequency control circuit 1-5 terminates the scanning operation, and then initiates the tracking operation in turn.

The wavelength tracking operation will be explained. In this embodiment, an object of tracking is only a center value of optical frequencies of the two tunable filters 1-2-1 and 1-2-2 (which is an intermediate frequency between the two optical frequencies, and is also referred to as a center wavelength or optical frequency), and the wavelength or optical frequency difference between the two tunable filters 1-2-1 and 1-2-2 is maintained at a preset value as discussed above. The reason therefor is that the tracking of the optical frequencies is indispensable because they are absolute values, while the system is well operable even if the wavelength difference is held at a preset value because of its relative value. The band of the optical frequency control is more than two orders lower than the band of data signal, and hence the mark and space optical frequencies of optical signal incident on the optical FSK receiver can be assumed for the optical frequency control system to be simultaneously incident (in this connection, see also the description in the related art).

In this case, a low frequency component of the difference signal between the light receiving circuits 1-4-1 and 1-4-2 is a zero-cross signal with the center wavelength or optical frequency (fs+fm)/2 of the optical FSK signal of the receiving channel being a reference. When a center value of the optical frequencies of the two tunable filters 1-2-1 and 1-2-2 comes to (fs+fm)/2, the low frequency component of the difference signal becomes zero. When the center value of the two optical frequencies deviates from (fs+fm)/2, the low frequency component of the difference signal becomes positive or negative. By utilizing the difference signal as an error signal, the center optical frequency of the optical FSK receiver (the center value between the optical frequencies of the two tunable filters 1-2-1 and 1-2-2) can be tracked to the center frequency (fs+fm)/2 of the optical FSK signal of the receiving channel.

In the first embodiment, the tuning is performed in the above manner, and the optical FSK signal is received with the tracking being performed.

Second Embodiment

A second embodiment according to the present invention, which is directed to an optical FSK receiver, will be described with reference to FIGS. 7A and 7B. The second embodiment relates to an integrated optical device for an optical FSK receiver, which is constructed by integrating the optical elements shown in FIG. 5, and is suitably used for reception of an optical FSK signal.

Figure 7A:
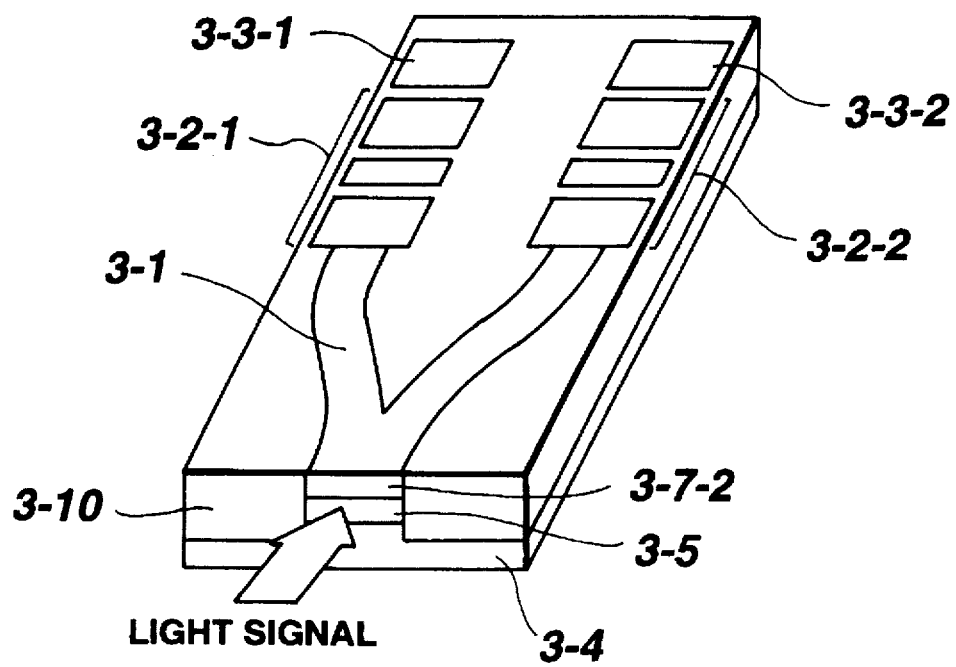
FIG. 7A is a perspective view showing a second embodiment of an integrated optical device for an optical FSK receiver of the present invention.
Figure 7B:
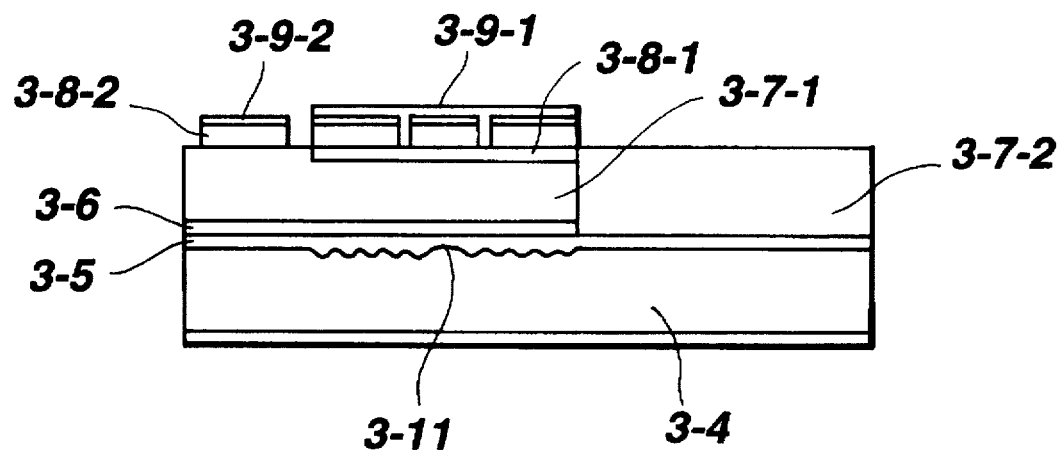
FIG. 7B is a cross-sectional view of the second embodiment of the present invention.

FIG. 7A is a perspective view of the integrated optical device for the optical FSK receiver. In FIG. 7A, reference numeral 3-1 is a Y-splitter corresponding to the light splitter or branching device for splitting wavelength-multiplexed light signals transmitted through a light transmission line and directing split signals to two tunable optical filters. Reference numerals 3-2-1 and 3-2-2 respectively designate DFB optical filters, and reference numerals 3-3-1 and 3-3-2 respectively designate light receiving devices. FIG. 7B is a cross-sectional view of the integrated optical device. In portions of DFB filters 3-2-1 and 3-2-2 and light receiving elements 3-3-1 and 3-3-2, on an InP substrate 3-4, an InGaAsP light guide layer 3-5 of 1.3 µm composition, an InGaAs/InGaAsP multiple quantum well (MQW) active layer 3-6 which has a gain peak at 1.55 µm, an InP cladding layer 3-7-1 and InGaAsP contact layers 3-8-1 and 3-8-2 are formed. In a portion of the Y-splitter 3-1, etching is conducted with the InGaAsP light guide layer 3-5 of 1.3 µm composition being left, and then an InP cladding layer 3-7-2 is formed by a selective regrowth. In a portion of the DFB filters 3-2-1 and 3-2-2, a λ/4 shift first order diffraction grating 3-11 is formed on the InP substrate 3-4, and an electrode 3-9-1 is formed with being separated into three portions by etching down to the contact layer 3-8-1. At its central position, a shift region of the λ/4 shift first order diffraction grating 3-11 is formed. In a portion of the light receiving elements 3-3-1 and 3-3-2, an electrode 3-9-2 is formed on the InGaAsP contact layer 3-8-2. Further, a portion other than those elements is buried with a high-resistance InP layer 3-10.

By utilizing the integrated optical device of this embodiment, the number of fabrication steps of the optical FSK receiver can be reduced, and the size of the device can be made compact. Tuning, tracking and optical FSK receiving operations are the same as those of the first embodiment.

Third Embodiment

A third embodiment of an optical FSK receiver according to the present invention will be described with reference to FIG. 5 and FIGS. 9 through 12. The third embodiment relates to a first example of an optical frequency control circuit in a current control type used in the first embodiment.

Figure 9:
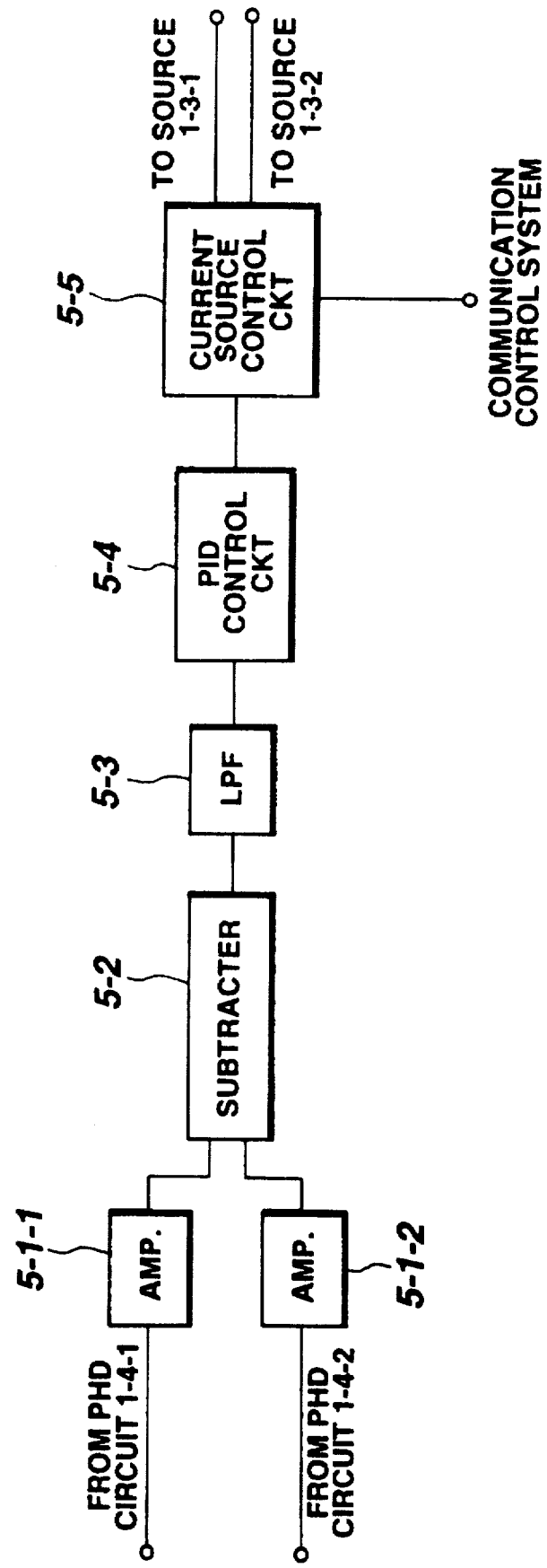
FIG. 9 is a block diagram showing a third embodiment of the present invention which is directed to an optical frequency control circuit of an optical FSK receiver.

An entire structure of this embodiment is shown in FIG. 5. FIG. 9 is a block diagram of an optical frequency control circuit 1-5 shown in FIG. 5. In FIG. 9, reference numerals 5-1-1 and 5-1-2 respectively designate amplifiers for amplifying outputs of the light receiving circuits 1-4-1 and 1-4-2, reference numeral 5-2 designates a subtracter for generating a difference between outputs of the two amplifiers 5-1-1 and 5-1-2, and reference numeral 5-3 designates a low pass filter (LPF) for extracting a low frequency component of the output from the subtracter 5-2. Further, reference numeral 5-4 designates a control circuit for generating an operation signal of feedback control, which serves as an error signal, from the output of the LPF 5-3. As the control circuit 5-4, a proportional-integral-derivative (PID) control circuit, which is formed by combining proportional, integral and derivative terms. Reference numeral 5-5 designates a current source control circuit for controlling outputs of two current sources 1-3-1 and 1-3-2, and the control circuit 5-5 is controlled by an external communication control system. Two outputs of the current source control circuit 5-5 are set at bias values for tuning optical frequencies of the tunable filters 1-2-1 and 1-2-2 to optical frequencies of optical FSK signal of a receiving channel. An offset value is set between the two bias values of those outputs so that the optical frequency difference between the two tunable filters 1-2-1 and 1-2-2 coincides with approximately a difference between mark and space optical frequencies of the optical FSK signal. During the tracking operation, values, which are produced by adding the operation value to the bias values, are output.

Figure 10:
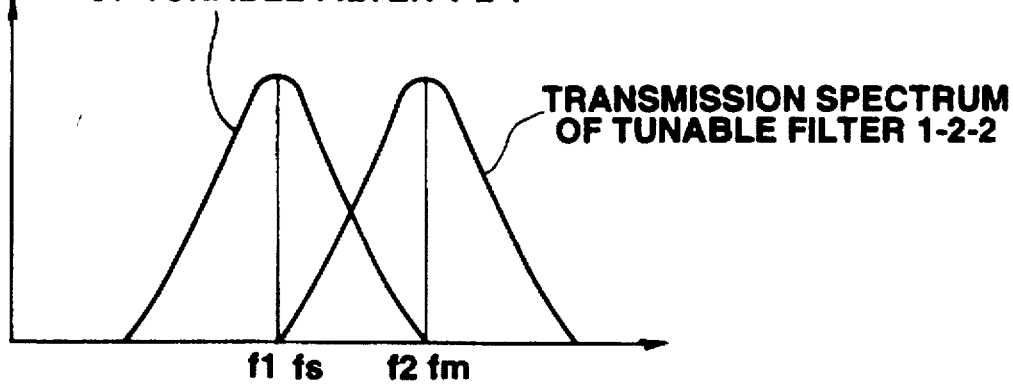
FIG. 10 is a view illustrating optical frequency characteristics of the tunable optical filter of the optical FSK receiver of the third embodiment and other embodiments.

FIG. 10 illustrates optical frequency characteristics of the tunable filters 1-2-1 and 1-2-2, and is substantially the same as FIG. 6. The optical frequency (referred to as f1) of the tunable optical filter 1-2-1 is tuned to fs, and the optical frequency (referred to as f2) of the tunable optical filter 1-2-2 is tuned to fm.

Figure 11A:
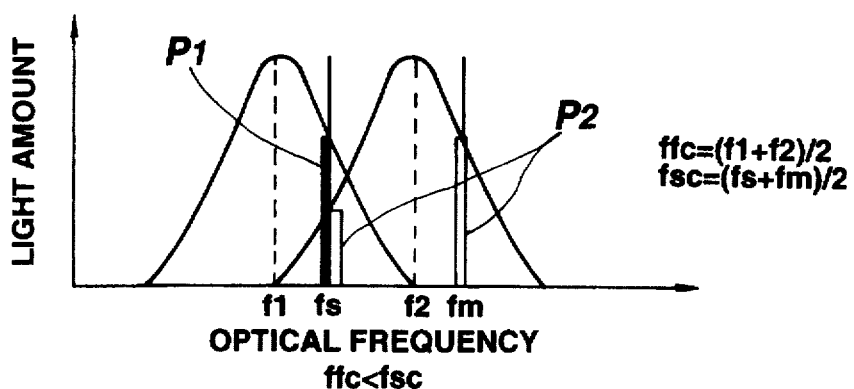
FIGS. 11A, 11B and 11C are respectively views illustrating the relationship between a center optical frequency of the optical FSK receiver of the third embodiment and other embodiments and an amount of light incident on a light receiving circuit.
Figure 11B:
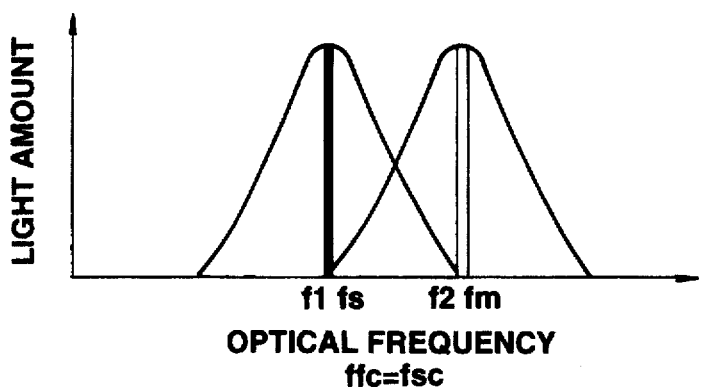
Figure 11C:
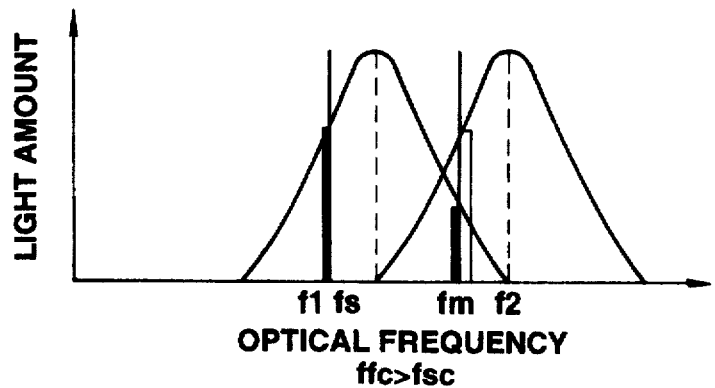

FIGS. 11A–11C illustrate the relation between a center optical frequency (f1+f2)/2 (referred to as ffc) of an optical FSK receiver and amounts of light incident on the light receiving circuits 1-4. Amounts of light incident on the light receiving circuits 1-4 are respectively sums of amounts of light transmitted through the tunable filters 1-2 at fs and fm in transmission spectra. In FIGS. 11A–11C, a thick black line indicates an amount of light (referred to as p1) incident on the light receiving circuit for receiving a space signal, and a thick white line indicates an amount of light (referred to as p2) incident on the light receiving circuit for receiving a mark signal. FIG. 11A illustrates a case of ffc<fsc, FIG. 11B illustrates a case of ffc=fsc, and FIG. 11C illustrates a case of ffc>fsc. Here, fsc indicates a center optical frequency (fs+fm)/2 of the optical FSK signal.

Figure 12:
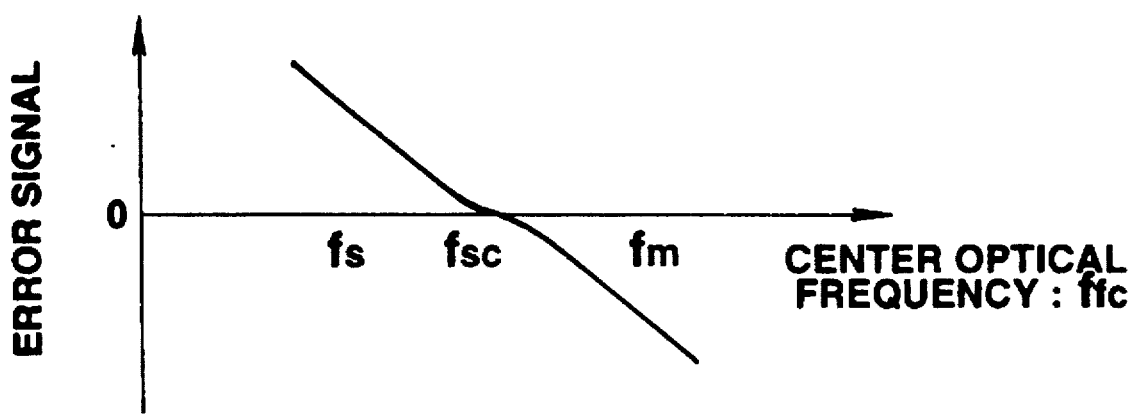
FIG. 12 is a view illustrating the relationship between a center optical frequency of the optical FSK receiver of the third embodiment and other embodiments and an error signal.

FIG. 12 shows the relation between ffc and an error signal (an output of the LPF 5-3).

Tuning and receiving operations of optical FSK signal are the same as those described in the first embodiment.

The tracking operation of optical frequencies of a receiving channel will be described. The optical frequency control circuit 1-5 controls the current sources 1-3-1 and 1-3-2 to achieve that operation.

In this embodiment, an object of tracking is only a center value ffc of optical frequencies of the two tunable filters 1-2-1 and 1-2-2, and a wavelength difference or interval ffd between the two tunable filters 1-2-1 and 1-2-2 is maintained at a preset value (f2–f1). The reason therefor is that the center optical frequency ffc of the optical FSK receiver is changed in a wide range during the channel selection operation, while the system is well operable even if the wavelength difference ffd is held at approximately a preset value fsd=(fm–fs).

The band of optical frequency control is set lower than the band of data signal. The optical signal incident on the optical FSK receiver can be assumed for the optical frequency control system in such a manner that mark and space optical frequencies are simultaneously incident, as described above.

In the optical frequency control circuit 1-5 shown in FIG. 9, the band of optical frequency control system is separated from the band of data signal by the LPF 5-3. Contributions of outputs of mark and space signal receiving systems to the output of the LPF 5-3 can be respectively represented by sums of thick white lines and thick black lines shown in FIGS. 11A–11C. The subtracter 5-2 adds signal from the mark signal receiving system, and subtracts signal from the space signal receiving system. Therefore, the output of the LPF 5-3 is equal to a value that is produced by subtracting the thick black line portion p2 from the thick white line portion p1. When the center optical frequency ffc of the optical FSK receiver is close to fsc, the output of LPF 5-3 is positive in the case of ffc<fsc (FIG. 11A), zero in the case of ffc=fsc (FIG. 11B) and negative in the case of ffc>fsc (FIG. 11C). That is, the output of the LPF 5-3 is a zero-cross signal which has a center at fsc as shown in FIG. 12. The feedback control is performed by using that signal as an error signal. Thus, the center optical frequency ffc of the optical FSK receiver can be tracked to the center optical frequency fsc of an optical FSK signal of the receiving channel.

In the optical FSK receiver of the present invention, the tracking of the center optical frequency ffc of the optical FSK receiver can be performed even when the interval between mark and space optical frequencies is approximately equal or close to a half width of the transmission spectrum of the tunable filters 1-2.

Fourth Embodiment

A fourth embodiment of an optical FSK receiver according to the present invention will be described with reference to FIG. 5 and FIGS. 13 through 15. The fourth embodiment relates to a second example of an optical frequency control circuit in a current control type used in the first embodiment.

Figure 13:
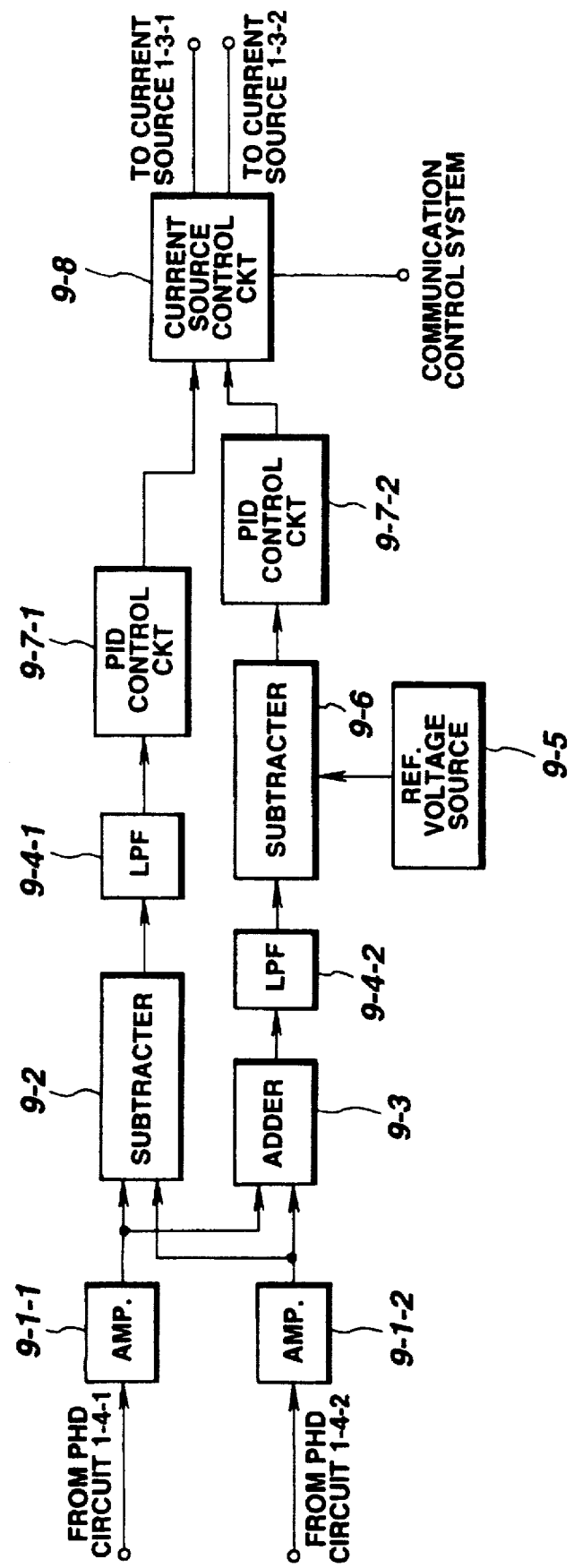
FIG. 13 is a block diagram showing a fourth embodiment of the present invention which is directed to an optical frequency control circuit of an optical FSK receiver.

An entire structure of this embodiment is shown in FIG. 5. FIG. 13 is a block diagram of an optical frequency control circuit 1-5 shown in FIG. 5. In FIG. 13, reference numerals 9-1-1 and 9-1-2 respectively designate amplifiers for amplifying outputs of light receiving circuits 1-4-1 and 1-4-2, reference numeral 9-2 designates a subtracter for generating a difference between outputs of the two amplifiers 9-1-1 and 9-1-2, reference numeral 9-3 designates an adder for producing a sum of outputs of the two amplifiers 9-1-1 and 9-1-2, reference numerals 9-4-1 and 9-4-2 respectively designate low pass filters (LPFs) for extracting low frequency components of the subtracter -2 and the adder 9-3, reference numeral 9-5 designates a reference voltage source and reference numeral 9-6 designates a subtracter for subtracting the output of the reference volatage source 9-5 from the output of the LPF 9-4-2. Further, reference numerals 9-7-1 and 9-7-2 respectively designate control circuits for generating operation signals of feedback control from outputs of the LPF 9-4-1 and the subtracter 9-6 which (operation signals) respectively serve as error signals. As the control circuits 9-7-1 and 9-7-2, a proportional-integral-derivative (PID) control circuit, which is formed by combining proportional, integral and derivative terms, is preferably used.

Reference numeral 9-8 designates a current source control circuit for controlling outputs of two current sources 1-3-1 and 1-3-2, and the control circuit 9-8 is controlled by an external communication control system. Two outputs of the current source control circuit 9-8 correspond to bias values, which are respectively set for the current sources 1-3-1 and 1-3-2 by the communication control system, at the time of channel selection, and correspond to values, which are respectively calculated from the two operation signals and the bias values, at the time of tracking operation. The bias values are set so that the optical frequencies of the two tunable filters 1-2-1 and 1-2-2 coincide with approximately mark and space optical frequencies of the optical FSK signal, respectively.

FIG. 10 also illustrates optical frequency characteristics of the tunable filters 1-2-1 and 1-2-2 of this embodiment.

FIGS. 11A–11C also illustrates the relation between a center optical frequency ffc=(f1+f2)/2 of an optical FSK receiver of this embodiment and amounts of light incident on the light receiving circuits.

FIG. 12 also shows the relation between ffc and an error signal of the tracking of ffc (an output of the LPF 9-4-1).

Figure 14A:
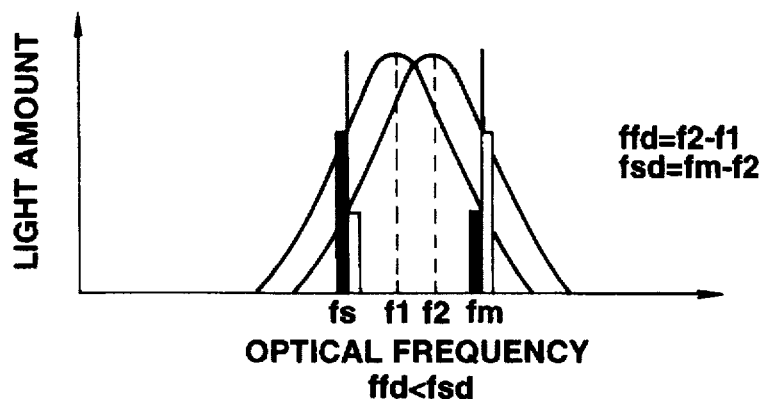
FIGS. 14A, 14B and 14C are respectively views illustrating the relationship between an optical frequency interval of the optical FSK receiver of the fourth embodiment and other embodiments and an amount of light incident on a light receiving circuit.
Figure 14B:
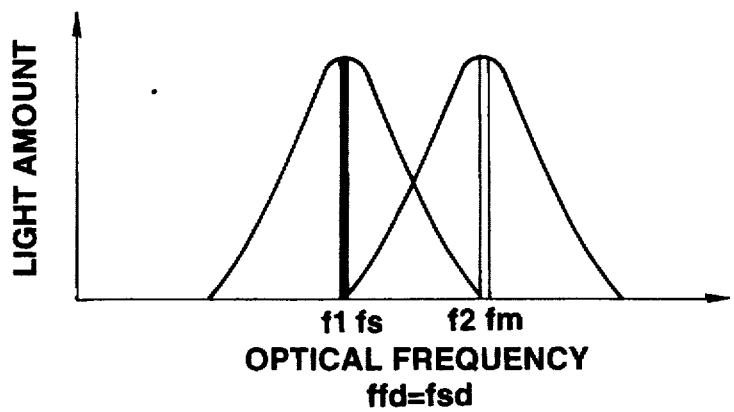
Figure 14C:
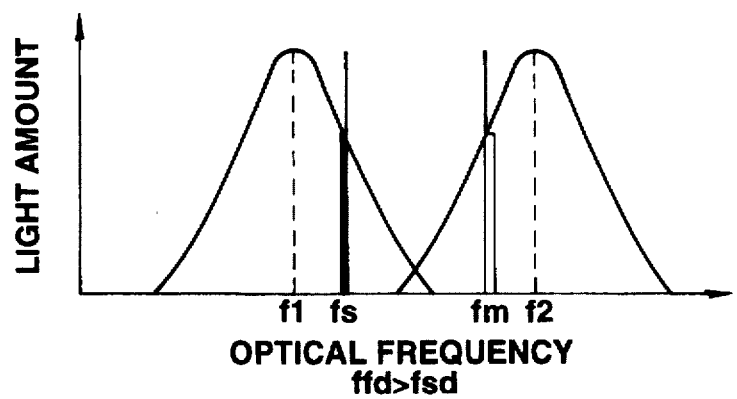

FIGS. 14A–14C illustrate the relation between an optical frequency interval ffd=(f2−f1) of two tunable optical filters 1-2-1 and 1-2-2 of an optical FSK receiver of this embodiment and amounts of light incident on light receiving circuits 1-4. Amounts of lights incident on the light receiving circuits 1-4 are respectively sums of amounts of light passing the tunable filters 1-2 at fs and fm in their transmission spectra. Similar to FIG. 11, in FIG. 14, a thick black line indicates an amount of light p1 incident on the light receiving circuit 1-4 for receiving a space signal, and a thick white line indicates an amount of light p2 incident on the light receiving circuit 1-4-2 for receiving a mark signal. FIG. 14A illustrates a case of ffd<fsd, FIG. 14B illustrates a case of ffd=fsd, and FIG. 14C illustrates a case of ffd>fsd. Here, fsd designates an optical frequency interval (fm−fs) of optical FSK signal.

Figure 15A:
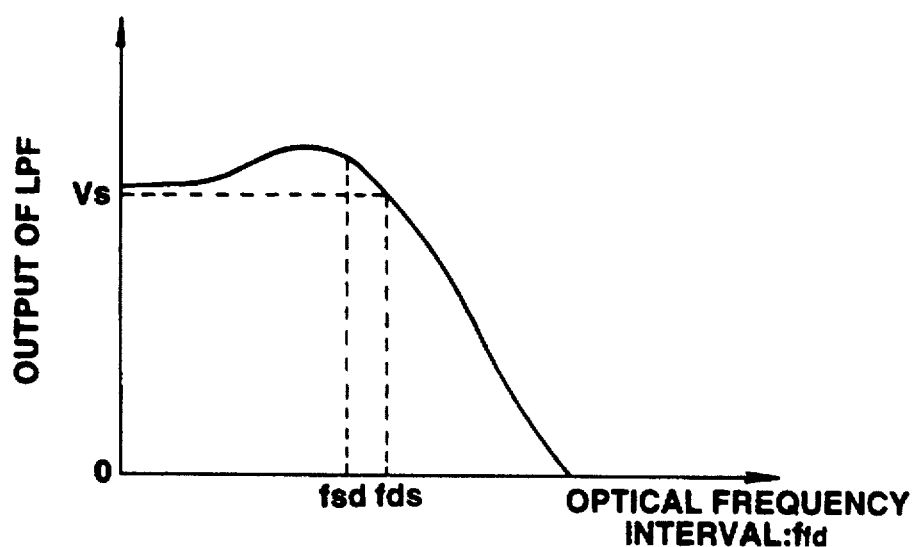
FIG. 15A is a view illustrating the relationship between an optical frequency interval of the optical FSK receiver of the fourth embodiment and other embodiments and an output of LPF.
Figure 15B:
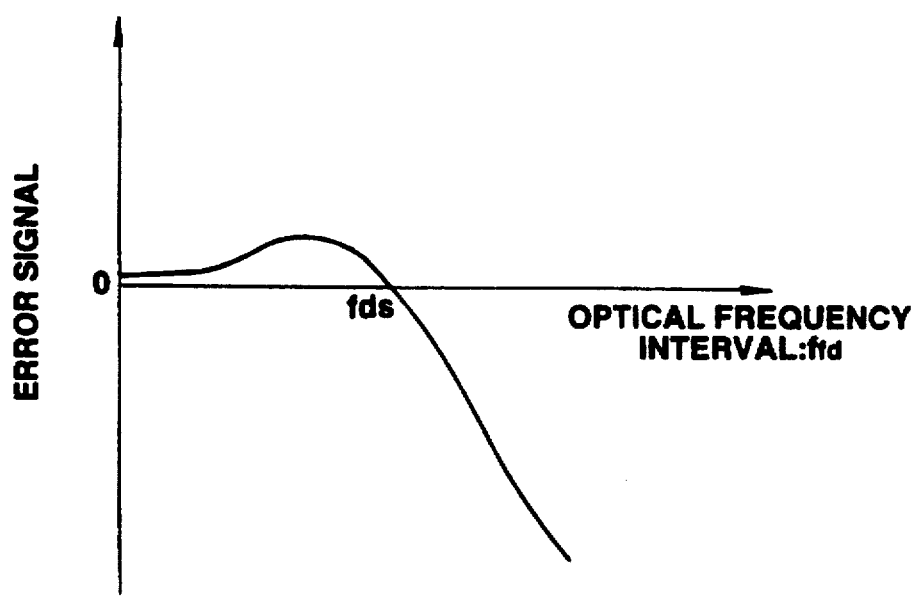
FIG. 15B is a view illustrating the relationship between an optical frequency interval of the optical FSK receiver of the fourth embodiment and other embodiments and an error signal.

FIG. 15 illustrates the relation between the optical frequency interval ffd=(f2−f1) and an error signal of the tracking of ffd. FIG. 15A illustrates the relation between ffd and an output of the LPF 9-4-2 from which an error signal is produced, and FIG. 15B illustrates the relation between ffd and an error signal (an output of the subtracter 9-6).

Tuning and receiving operations of optical FSK signal are the same as those described in the first embodiment.

Tracking operation of optical frequencies of the receiving channel will be described. The optical frequency control circuit 1-5 controls the current sources 1-3-1 and 1-3-2 to achieve that operation.

In the optical frequency control circuit 1-5 shown in FIG. 13, the band of optical frequency control system is separated from the band of data signal by the LPFs 9-4.

Since the optical FSK receiver includes two tunable optical filters 1-2-1 and 1-2-2, there are two tracking values in this embodiment. In this embodiment, objects of tracking are a center optical frequency ffc of the two optical filters and an optical frequency interval ffd. As described below, the two tracking objects can be tracked independently. In this embodiment, the tracking of ffc is implemented by using a low frequency component of the difference signal between the two amplifiers 9-1-1 and 9-1-2 as an error signal, and the tracking of ffd is conducted by using a difference signal between the low frequency component of the sum signal and the reference voltage as an error signal.

The tracking of the center optical frequency ffc of the optical FSK receiver is implemented in the same manner as that of the third embodiment. That is, the PID control circuit 9-7-1 produces an operation signal by using the output of the LPF 9-4-1 as an error signal, and the current source control circuit 9-8 controls the current sources 1-3-1 and 1-3-2 based on the operation signal. Since ffc=(f1+f2)/2, increment and decrement of ffc relative to f1 are the same as those of ffc relative to f2 both in amount and direction. Therefore, operations of the current sources 1-3-1 and 1-3-2 are the same in amount and direction.

The characteristic of the error signal is not changed greatly when ffd is close to fsd. Therefore, the tracking of the center optical frequency ffc of the optical FSK receiver can be implemented independently from the tracking of the optical frequency interval ffd of the tunable filters.

Next, the tracking of the optical frequency interval ffd of the optical FSK receiver will be described. In order to implement the tracking of ffd, the PID control circuit 9-7-2 produces an operation signal by using the output of the subtracter 9-6 as an error signal, and the current source control circuit 9-8 controls the current sources 1-3-1 and 1-3-2 based on the operation signal. Since ffd=(f2−f1), amounts of increment and decrement of ffd relative to f1 are the same as those of ffd relative to f2, while the direction of increment and decrement of ffd relative to f1 is opposite to that of ffd relative to f2. Therefore, operations of the curent sources 1-3-1 and 1-3-2 are the same in amount, but opposite to each other in direction.

Contributions of outputs of mark and space signal receiving systems to the output of the LPF 9-4-2 can be respectively represented by sums of thick white lines and thick black lines shown in FIG. 14. Since the adder 9-3 adds the signal from the mark signal receiving system to the signal from the space signal receiving system, the output of the LPF 9-4-2 is a value which is produced by adding the thick white line portions p1 to the thick black line portions p2.

FIG. 14A shows a case of ffd<fsd, FIG. 14B shows a case of ffd=fsd and FIG. 14C shows a case of ffd>fsd. That value monotonously decreases in the vicinity of the optical frequency interval fsd of the optical FSK signal as shown in FIG. 15A. A range of such monotonous decrease is narrow when ffd<fsd, while wide when ffd>fsd. As a result, a zero-cross signal, whose center is at fds as shown in FIG. 15B, can be obtained by producing a difference between the output of LPF 9-4-2 and the reference voltage Vs by the subtracter 9-6 with an ouput value Vs of the LPF 9-4-2, created when ffd is equal to a value fds slightly larger than fsd, being set as a reference value of the reference voltage source 9-5. Feedback control is performed by using that signal as an error signal. Thus, the optical frequency interval ffd of optical FSK receiver can be tracked to the value fds close to the optical frequency interval fsd of optical FSK signal of the receiving channel. The characteristic of the error signal is not changed greatly when the center optical frequency ffc of the optical FSK receiver is close to fsc. Thus, the tracking of ffd can be performed independently from the tracking of ffc.

Since the tracking optical frequency distance ffd of the tunable filters is performed, this embodiment has a high resistance to fluctuation of the optical frequency interval fsd of the optical FSK signal.

Fifth Embodiment

A fifth embodiment of an optical FSK receiver according to the present invention will be described with reference to FIG. 5 and FIGS. 16 through 18. The fifth embodiment relates to a third example of an optical frequency control circuit in a current control type used in the first embodiment.

Figure 16:
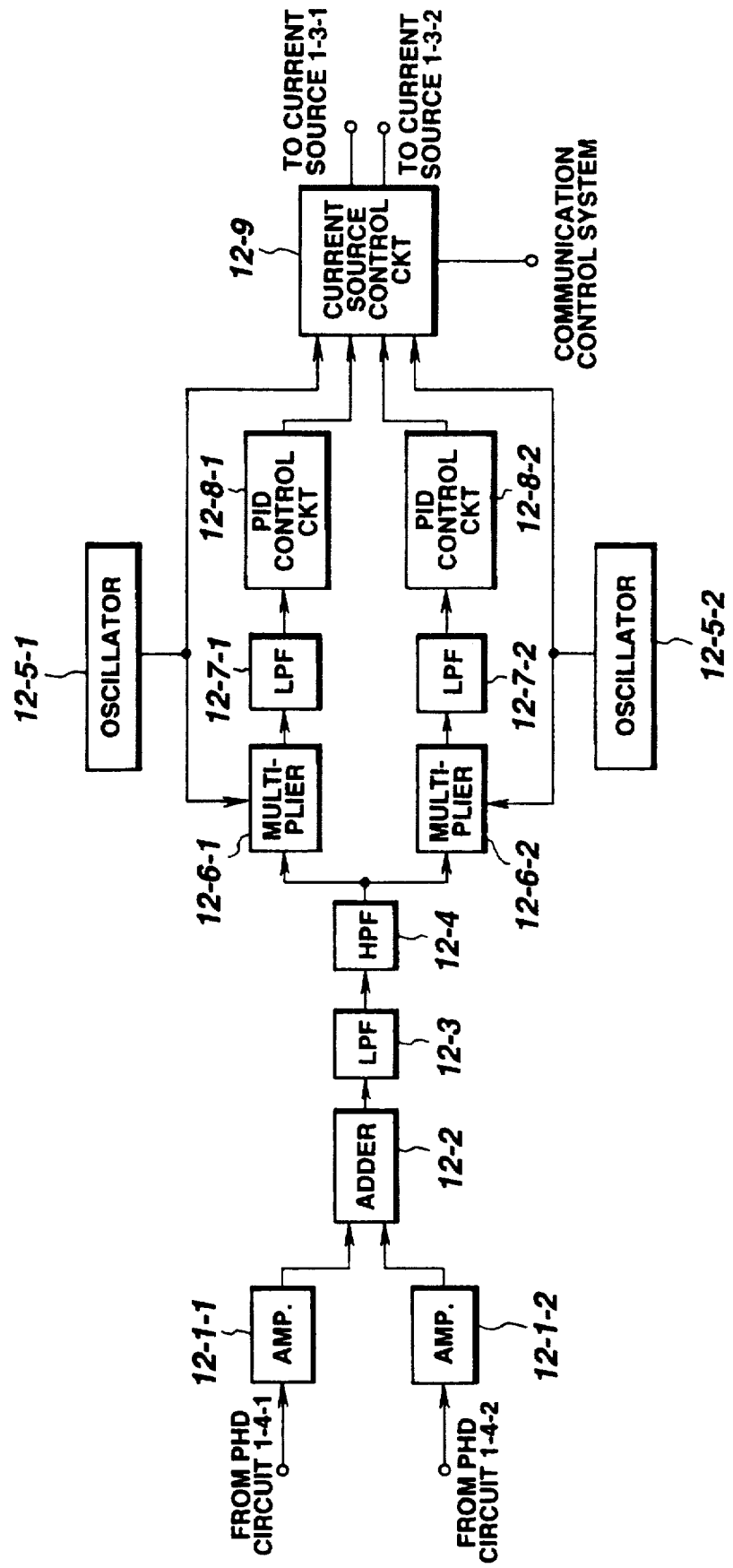
FIG. 16 is a block diagram showing an fifth embodiment of the present invention which is directed to an optical frequency control circuit of an optical FSK receiver.

An entire structure of this embodiment is shown in FIG. 5. FIG. 16 is a block diagram of an optical frequency control circuit 1-5 shown in FIG. 5. In FIG. 16, reference numerals 12-1-1 and 12-1-2 respectively designate amplifiers for amplifying outputs of light receiving circuits 1-4-1 and 1-4-2, reference numeral 12-2 designates an adder for producing a sum of outputs of the two amplifiers 12-1-1 and 12-1-2, reference numeral 12-3 designates a low pass filter (LPF) for extracting a low frequency component of the output of the adder 12-2, and reference numeral 12-4 designates a high pass filter (HPF) for removing a DC component of the output of the LPF 12-3. Further, reference numerals 12-5-1 and 12-5-2 respectively designate oscillators for generating signals for modulating the optical frequencies of the tunable filters 1-2-1 and 1-2-2. A sinusoidal wave is preferably used as the modulation signal.

Further, reference numerals 12-6-1 and 12-6-2 respectively designate multipliers for multiplying the output of the HPE 12-4 into the outputs of the oscillators 12-5-1 and 12-5-2 which are respectively sinusoidal waves, and reference numerals 12-7-1 and 12-7-2 respectively designate low pass filters for extracting low frequency components of the outputs of the multipliers 12-6. The relationship among a cut-off frequency fl1 of the LPF 12-3, a cut-off frequency fh of the HPF 12-4, a cut-off frequency fl21 of the LPF 12-7-1, a cut-off frequency fl22 of the LPF 12-7-2 and frequencies fu1 and fu2 of modulation signals of the oscillators 12-5-1 and 12-5-2 is:

fh, fl21, fl22<fu1, fu2 <fl1.

Further, reference numerals 12-8-1 and 12-8-2 respectively designate control circuits for generating operation signals of feedback control from outputs of the LPFs 12-7-1 and 12-7-2 which respectively serve as error signals. As the control circuits 12-8-1 and 12-8-2, a proportional-integral-derivative (PIP) control circuit, which is formed by combining proportional, integral and derivative terms, is preferably used.

Reference numeral 12-9 designates a current source control circuit for controlling outputs of two current sources 1-3-1 and 1-3-2, and the control circuit 12-9 is controlled by an external communication control system. Two outputs of the current source control circuit 12-9 correspond to bias values, which are respectively set for the current sources 1-3-1 and 1-3-2 by the communication control system, at the time of channel selection, and correspond to values, which are respectively calculated from the two operation signals, the sinusoidal waves from the oscillators 12-5-1 and 12-5-2 and the bias values, at the time of tracking operation. The current source control circuit 12-9 outputs signals from two output terminals in such a manner that only the sinusoidal wave from the oscillator 12-5-2 of the two input sinusoidal waves is superimposed on other components, which are output from the output terminals, with being inverted each other. Thereby, optical frequencies of the two tunable optical filters 1-2-1 and 1-2-2 are modulated in the same phases at the frequency fu1 and in opposite phases at the frequency fu2.

FIG. 10 also shows optical frequency characteristics of the tunable filters of this embodiment.

FIG. 11 also illustrates the relation between a center optical frequency ffc=(f1+f2)/2 of an optical FSK receiver of this embodiment and amounts of light incident on light receiving circuits 1-4.

Figure 17A:
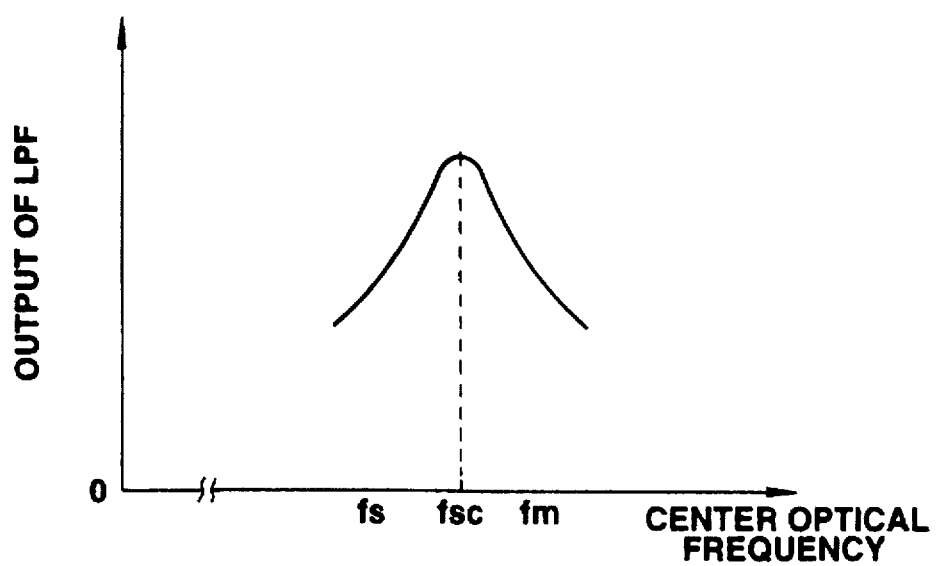
FIG. 17A is a view illustrating the relationship between a center optical frequency of the optical FSK receiver of the fifth embodiment and other embodiments and an output of LPF.
Figure 17B:
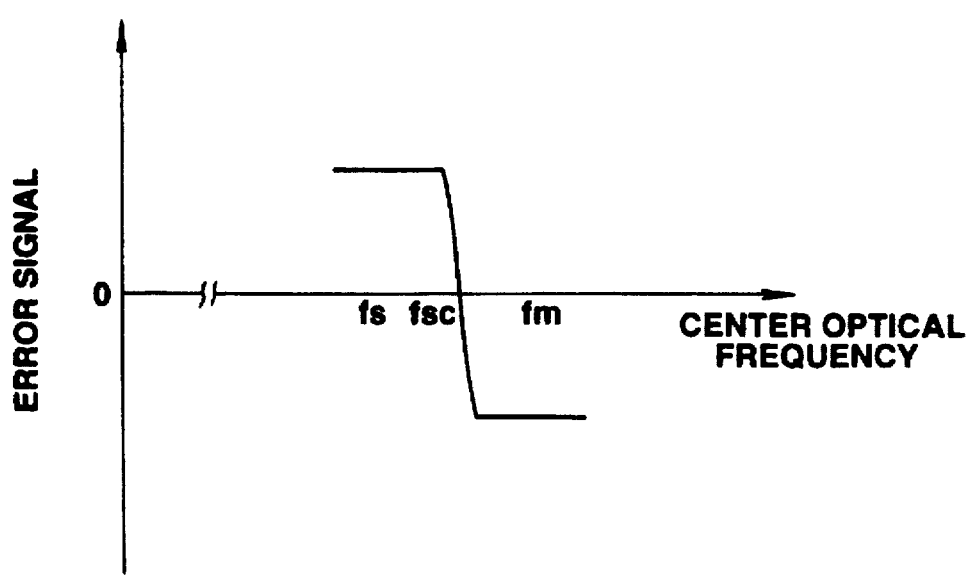
FIG. 17B is a view illustrating the relationship between a center optical frequency of the optical FSK receiver of the fifth embodiment and other embodiments and an error signal.

FIG. 17 shows the relation between ffc and an error signal of the tracking of ffc. FIG. 17A illustrates the relation between ffc obtained when only ffc is modulated and the output of the HPF 12-4 (or LPF 12-3), and FIG. 17B illustrates the relation between ffc and an error signal (the output of the LPF 12-7-1).

FIG. 14 also illustrates the relationship between an optical frequency interval ffd=(f2−f1) of two tunable optical filters 1-2-1 and 1-2-2 of an optical FSK receiver of this embodiment and amounts of light incident on light receiving circuits 1-4.

FIG. 18 illustrates the relation between the optical frequency interval ffd=(f2−f1) and an error signal of the tracking of ffd.

Figure 18A:
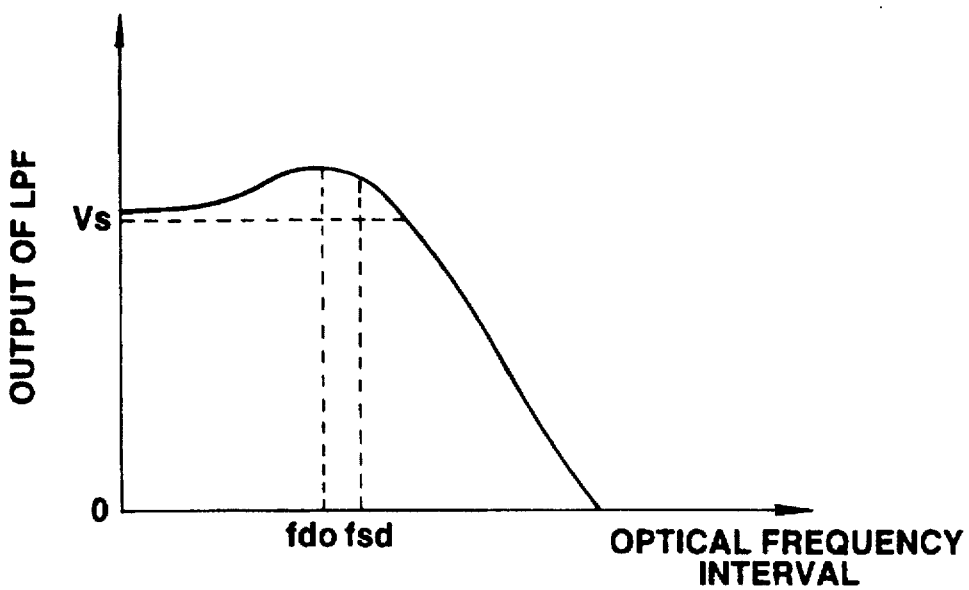
FIG. 18A is a view illustrating the relationship between an optical frequency interval of the optical FSK receiver of the fifth embodiment and other embodiments and an output of LPF.
Figure 18B:
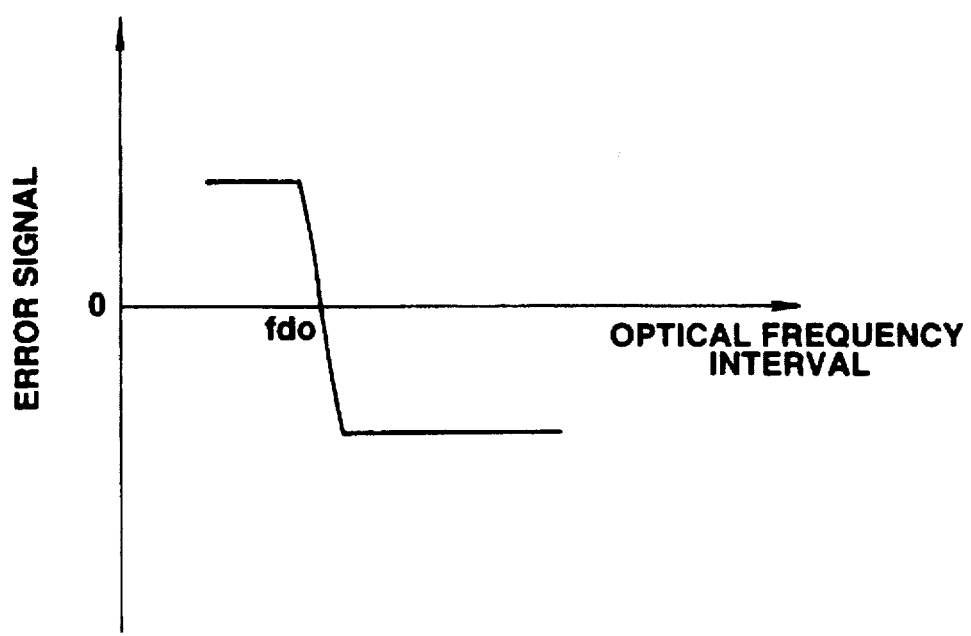
FIG. 18B is a view illustrating the relationship between an optical frequency interval of the optical FSK receiver of the fifth embodiment and other embodiments and an error signal.

FIG. 18A illustrates the relation between ffd obtained when only ffd is modulated and the output of the HPF 12-4 (or LPF 12-3), and FIG. 18B illustrates the relation between ffd and an error signal (the output of the LPF 12-7-2).

Tuning and receiving operations of optical FSK signal are the same as those described in the first embodiment.

Tracking operation of optical frequencies of a receiving channel will be described. The optical frequency control circuit 1-5 controls the current sources 1-3-1 and 1-3-2 to achieve that operation.

In the optical frequency control circuit 1-5 shown in FIG. 16, the band of optical frequency control system is separated from the band of data signal by the LPF 12-3.

Since the optical FSK receiver includes two tunable optical filters 1-2-1 and 1-2-2, there are two tracking objects also in this embodiment. In this embodiment, the objects of tracking are a center optical frequency ffc of the two optical filters 1-2-1 and 1-2-2 and an optical frequency interval ffd thereof. As described below, the two tracking amounts can be tracked independently. In this embodiment, the trackings of ffc and ffd are implemented by modulating ffc and ffd with sinusoidal waves at frequencies fu1 and fu2 and producing error signals from the phase relations between components of frequencies fu1 and fu2 contained in the sum signal of the amplifiers 12-1-1 and 12-1-2 and the sinusoidal waves for modulations. Thus, the trackings are performed based on those error signals. The frequencies ful and fu2 of two sinusoidal waves are set so that they can be separated by the multiplication in the multipliers 12-6, and thus those modulations do not affect the production of the two error signals.

Initially, the tracking of the center optical frequency ffc of the optical FSK receiver will be described. In order to implement the tracking of ffc, the PID control circuit 12-8-1 produces an operation signal by using the output of the LPF 12-7-1 as an error signal, and the current source control circuit 12-9 controls the current sources 1-3-1 and 1-3-2 based on the operation signal.

FIG. 11 shows the relationship between ffc and the output of the LPF 12-3 (here, ffd=fsd is assumed). The output of the LPF 12-3 is a sum of thick black line and thick white line.

The relation between ffc and the output of the LPF 12-3 has a peak at fsc as shown in 17A. The relation does not vary largely when the optical frequency interval ffd of the two tunable filters 1-2 is close to fsd. Therefore, the following exaplanation holds true when ffd is close to fsd, and as a result, the tracking of ffc can be performed independently from the tracking of ffd.

When f1 and f2 are modulated by the sinusoudal wave of a small amplitude and frequency ful, ffc can be modulated by the sinusoidal wave of a small amplitude and frequency ful with ffd being kept constant. At this time, the phase relationship between a component of frequency ful of the output of the LPF 12-3 (the output of the HPF 12-4) and the output of the oscillator 12-5-1 is reversed at fsc. For example, if the phases are the same in a range of ffc<fsc, the phases are opposite in a range of ffc>fsc. Based on that phase relationship, the center optical frequency ffc of the two tunable filters 1-2 is tracked to the center optical frequency fsc of the optical FSK signal of the receiving channel.

In this embodiment, the phase relationship is detected by multiplication and extraction of a low frequency component. A DC component of the output of the LPF 12-3 is removed by the HPF 12-4, a result thereof is multiplied into the sinusoidal wave of frequency ful from the oscillator 12-5-1 by the multiplier 12-6-1 and a low frequency component is extracted by the LPF 12-7-1 whose cut-off frequency is set lower than ful. The low frequency component of the output of the multiplier 12-6-1 is positive when the phase relationship between two input signals thereinto is in-phase, and negative when opposite. FIG. 17B illustrates such situation. The output of the LPF 12-7-1 is a zero-cross signal whose center is at fsc. Feedback control is conducted by using that signal as an error signal, and thus the center optical frequency ffc of optical FSK receiver can be tracked to the center optical frequency fsc of the optical FSK signal of the receiving channel.

Then, the tracking of the optical frequency interval ffd of the optical FSK receiver will be described. In order to implement the tracking of ffd, the PID control circuit 12-8-2 produces an operation signal by using the output of the LPF 12-7-2 as an error signal, and the current source control circuit 12-9 controls the current sources 1-3-1 and 1-3-2 based on the operation signal.

FIG. 14 also shows the relation between ffd and the output of the LPF 12-3 (here, ffc=fsc is assumed). The output of the LPF 12-3 is a sum of thick black line and thick white line.

The relation between ffd and the output of the LPF 12-3 has a peak at a value fdo close to fsd as shown in 18A. The reason therefor is that the transmission spectra of the tunable filters change relatively steeply at their skirts and change gently at their peaks. The relation does not vary largely when the center optical frequency ffc of the optical FSK receiver is close to fsc. Therefore, the following exaplanation holds true when ffc is close to fsc, and as a result, the tracking of ffd can be performed independently from the tracking of ffc.

When f1 and f2 are respectively modulated by the mutually inverted sinusoudal waves of a small amplitude and frequency fu2, ffd can be modulated by the sinusoidal wave of a small amplitude and frequency fu2 with ffc being kept constant. At this time, the phase relationship between a component of frequency fu2 of the output of the LPF 12-3 (the output of the HPF 12-4) and the output of the oscillator 12-5-2 is reversed at fdo. For example, if the phases are the same in a range of ffd<fdo, the phases are opposite in a range of ffd>fdo. Based on that phase relationship, the optical frequency interval ffd is tracked to fdo.

In this embodiment, the phase relationship of ffd is detected by the same manner as that of ffc. FIG. 18B shows the relation between ffd and an error signal (the output of the LPF 12-7-2). Feedback control is performed by using that signal as an error signal, and thus the center frequency interval ffd of the optical FSK receiver can be tracked to the value fdo in the vicinity of the optical frequency interval fsd of optical FSK signal of the receiving channel.

In the optical FSK receiver of this embodiment, the tracking of center optical frequency ffc of the optical FSK receiver can be achieved even when the interval between mark and space optical frequencies is equal or close to a half width of the transmission spectrum of the tunable filters 1-2. Further, since the optical frequency distance ffd of the tunable filters is tracked, this embodiment also has a high resistance to fluctuation of the optical frequency interval fsd of the optical FSK signal.

Sixth Embodiment

A sixth embodiment of an optical FSK receiver according to the present invention will be described with reference to FIGS. 5 and 19 and so forth. The sixth embodiment relates to a fourth example of an optical frequency control circuit in a current control type used in the first embodiment.

An entire structure of this embodiment is shown in FIG. 5. FIG. 19 is a block diagram of an optical frequency control circuit 1-5 shown in FIG. 5. In FIG. 19, reference numerals 15-1-1 and 15-1-2 respectively designate amplifiers for amplifying outputs of light receiving circuits 1-4-1 and 1-4-2, reference numeral 15-2 designates a subtracter for producing a difference of outputs of the amplifiers 15-1-1 and 15-1-2, reference numeral 15-3 designates an adder for producing a sum of outputs of the two amplifiers 15-1-1 and 15-1-2, reference numerals 15-4-1 and 15-4-2 respectively designate low pass filters (LPFs) for extracting low frequency components of the outputs of the subtracter 15-2 and the adder 15-3, and reference numeral 15-5 designates a high pass filter (HPF) for removing a DC component of the output of the LPF 15-4-2. Further, reference numeral 15-6 designates an oscillator for generating a signal for modulating the optical frequencies of the tunable filters 1-2-1 and 1-2-2. A sinusoidal wave is preferably used as the modulation signal.

Further, reference numerals 15-7 designates a multiplier for multiplying the output of the HPE 15-5 into the output of the oscillator 15-6 which is a sinusoidal wave, and reference numeral 15-8 designates a low pass filter for extracting a low frequency component of the output of the multiplier 15-7. The relationship among cut-off frequency fl1 of LPFs 15-4-1 and 15-4-2, cut-off frequency fh of HPF 15-5, cut-off frequency fl2 of LPF 15-8 and frequency f of the sinusoidal wave is:

fh, fl2<f<fl1.

Further, reference numerals 15-9-1 and 15-9-2 respectively designate control circuits for generating operation signals of feedback control from outputs of the LPFs 15-4-1 and 15-8 which respectively serve as error signals. As the control circuits 15-9-1 and 15-9-2, a proportional-integral-derivative (PID) control circuit, which is formed by combining proportional, integral and derivative terms, is preferably used.

Reference numeral 15-10 designates a current source control circuit for controlling outputs of two current sources 1-3-1 and 1-3-2, and the control circuit 15-10 is controlled by an external communication control system. Two outputs of the current source control circuit 15-10 correspond to bias values, which are respectively set for the current sources 1-3-1 and 1-3-2 by the communication control system, at the time of channel selection, and correspond to values, which are respectively calculated from the two operation signals, the sinusoidal wave from the oscillator 15-6 and the bias values, at the time of tracking. The current source control circuit 15-10 outputs signals from two output terminals in such a manner that the mutually inverted sinusoidal waves from the oscillator 15-6 are superimposed on other components. Thereby, optical frequencies of the two tunable optical filters 1-2-1 and 1-2-2 are modulated with opposite phases.

FIG. 10 also shows optical frequency characteristics of the tunable filters of this embodiment.

FIG. 11 also illustrates the relation between a center optical frequency ffc=(f1+f2)/2 of an optical FSK receiver of this embodiment and amounts of light incident on light receiving circuits 1-4.

FIG. 12 also illustrates the relation between ffc and an error signal (the output of the LPF 15-8) of the tracking of ffc.

FIG. 14 also illustrates the relationship between an optical frequency interval ffd=(f2-f1) of two tunable optical filters 1-2-1 and 1-2-2 of an optical FSK receiver of this embodiment and amounts of light incident on light receiving circuits 1-4.

FIG. 18 also illustrates the relation between the optical frequency interval ffd=(f2-f1) and an error signal of the tracking of ffd of this embodiment.

FIG. 18A illustrates the relation between ffd and the output of the LPF 15-4-2, and FIG. 18B illustrates the relation between ffd and an error signal (the output of the LPF 15-8).

Tuning and receiving operations of optical FSK signal are the same as those of the first embodiment.

The tracking operation of optical frequency of the receiving channel will be described. The optical frequency control circuit 1-5 controls the current sources 1-3-1 and 1-3-2 to achieve that operation.

Figure 19:
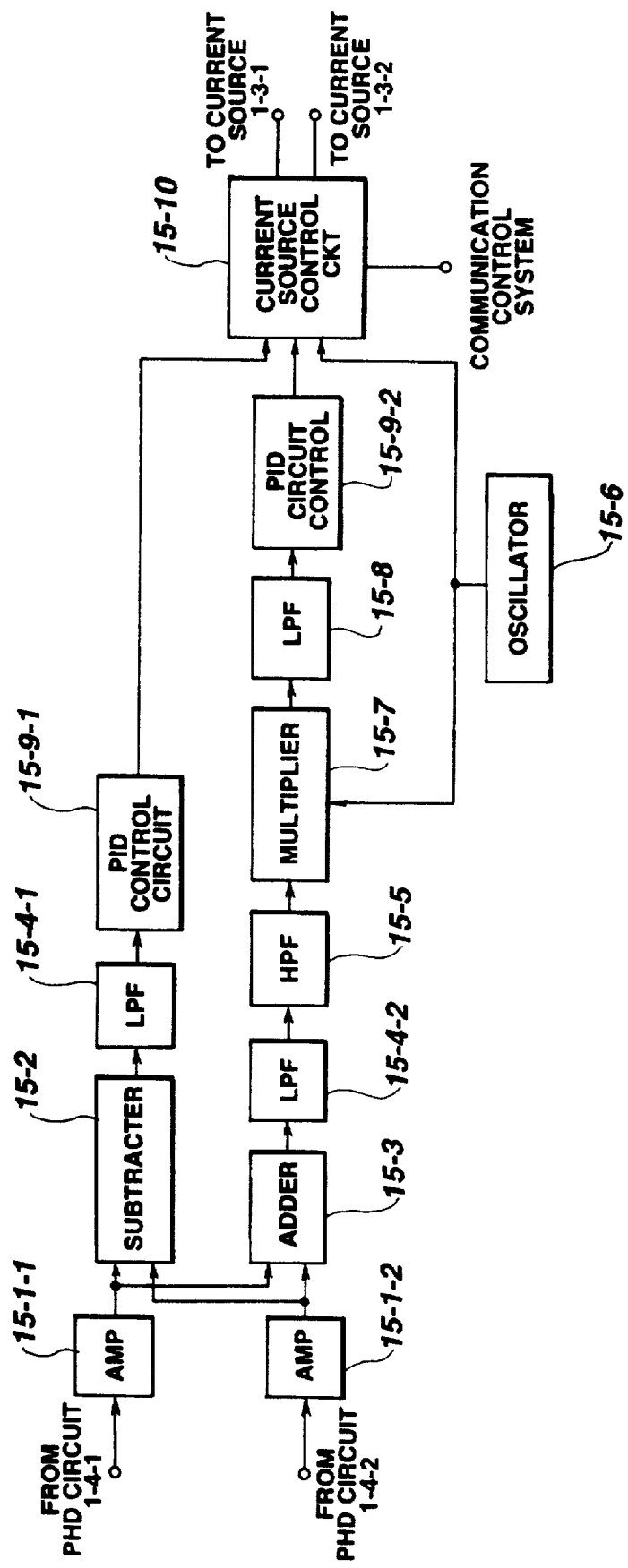
FIG. 19 is a block diagram showing an optical frequency control circuit of an optical FSK receiver of a sixth embodiment of the present invention.

In the optical frequency control circuit 1-5 shown in FIG. 19, the band of optical frequency control system is separated from the band of data signal by the LPFs 15-4-1 and 15-4-2.

Since the optical FSK receiver includes two tunable optical filters 1-2-1 and 1-2-2, there are two tracking objects in this embodiment. In this embodiment, the objects of tracking are a center optical frequency ffc of the two optical filters 1-2-1 and 1-2-2 and an optical frequency interval ffd thereof. As described below, the two tracking objects can be tracked independently. In this embodiment, the tracking of ffc is performed by using a low frequency component of the difference signal of the two amplifiers 15-1-1 and 15-1-2. The tracking of ffd is implemented by modulating the optical frequencies of the two tunable filters 2-1 with mutually inverted sinusoidal waves, detecting the phase relation between the thus obtained modulated component of the sum signal and producing an error signal therefrom.

Initially, the tracking of the center optical frequency ffc of the optical FSK receiver will be described. In order to implement the tracking of ffc, the PID control circuit 15-9-1 produces an operation signal by using the output of the LPF 15-4-1 as an error signal, and the current source control circuit 15-10 controls the current sources 1-3-1 and 1-3-2 based on the operation signal. This is the same as that of the third and fourth embodiments.

The characteristic of the error signal is not changed greatly when ffd is close to fsd. Further, as described below, the modulation of f1 and f2 for the modulation of ffd is performed with ffc being maintained at a constant value. Therefore, the tracking of the center optical frequency ffc of the optical FSK receiver can be implemented independently from the tracking of the optical frequency interval ffd of the tunable filters.

Then, the tracking of the optical frequency interval ffd of the optical FSK receiver will be described. In order to implement the tracking of ffd, the PID control circuit 15-9-2 produces an operation signal by using the output of the LPF 15-8 as an error signal, and the current source control circuit 15-10 controls the current sources 1-3-1 and 1-3-2 based on the operation signal.

Since the adder 15-3 adds the signal from the mark signal receiving system to the signal from the space signal receiving system, the output of the LPF 15-4-2 or a low frequency component of the sum signal of the two amplifiers 15-1-1 and 15-1-2 is a value which is produced by adding the thick white line portion p1 to the thick black line portion p2.

The output of the LPF 15-4-2 has a peak at a value fdo close to fsd as shown in 18A. When f1 and f2 are modulated by mutually inverted sinusoidal waves of frequency f and small amplitude, ffd can be modulated by the sinusoidal wave of small amplitude and frequency f with ffc being kept constant. At this time, the phase relationship between a component of frequency f of the output of the LPF 15-4-2 and the output of the oscillator 15-6 is reversed at fdo. For example, if the phases are the same in a range of ffd<fdo, the phases are opposite in a range of ffd>fdo. Based on that phase relationship, the optical frequency interval ffd is tracked to fdo.

In this embodiment, the phase relationship is detected by multiplication and extraction of a low frequency component. A DC component of the output of the LPF 15-4-2 is removed by the HPF 15-5, its result is multiplied into the frequency of the oscillator 15-6 by the multiplier 15-7 and a low frequency component is extracted by the LPF 15-8 whose cut-off frequency is set lower than f. The low frequency component of the output of the multiplier 15-7 is positive when the phase relation of the two input signals thereinto is in-phse, and negative when opposite. FIG. 18B shows such a situation. The output of the LPF 15-8 is a zero-cross signal whose center is at fdo. Feedback control is performed by using that signal as an error signal. Thus, the optical frequency interval ffd of the optical FSK receiver can be tracked to a value fdo near to the optical frequency interval fsd of the optical FSK signal of the receiving channel.

Since the optical frequency distance ffd of the tunable filters is tracked, this embodiment has a high resistance to fluctuation of the optical frequency interval fsd of the optical FSK signal.

Seventh Embodiment

Figure 20:
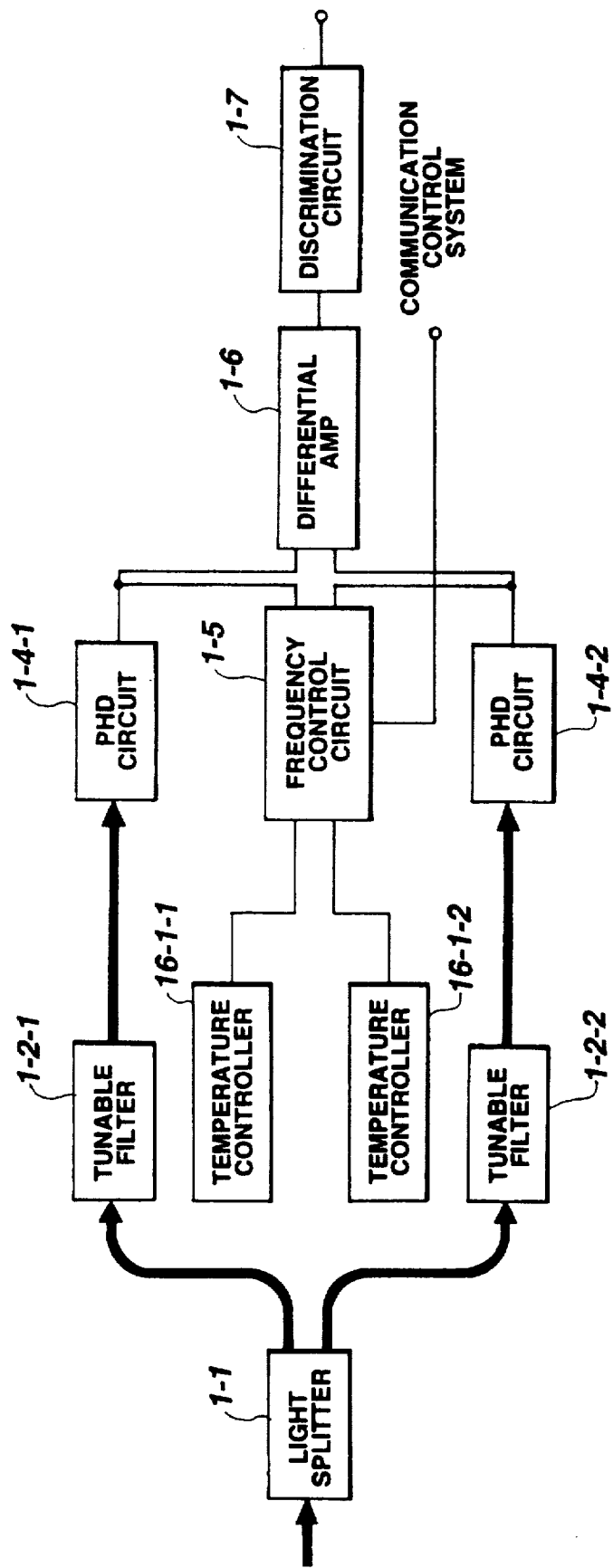
FIG. 20 is a block diagram showing a seventh embodiment of the present invention which is directed to an optical FSK receiver.

FIG. 20 is a block diagram of a seventh embodiment of the present invention, which is directed to an optical FSK receiver. The difference between this embodiment and the above-discussed embodiments is in that optical frequencies of the tunable filters 1-2 is controlled by temperature instead of the injection current thereinto. Therefore, the outputs of the optical frequency control circuit 1-5 are connected to temperature controllers 16-1-1 and 16-1-2. As the temperature controllers 16-1-1 and 116-1-2, an apparatus, in which a change in temperature is detected by a thermistor and the temperature is caused to remain constant by a Peltier device, may be preferably used. Other structural elements, operations and the like are substantially the same as those of each of the above-discussed embodiments. Since the optical frequency of a DFB filter can also be controlled by temperature, this embodiment utilizes such a fact.

Eighth Embodiment

Figure 21:
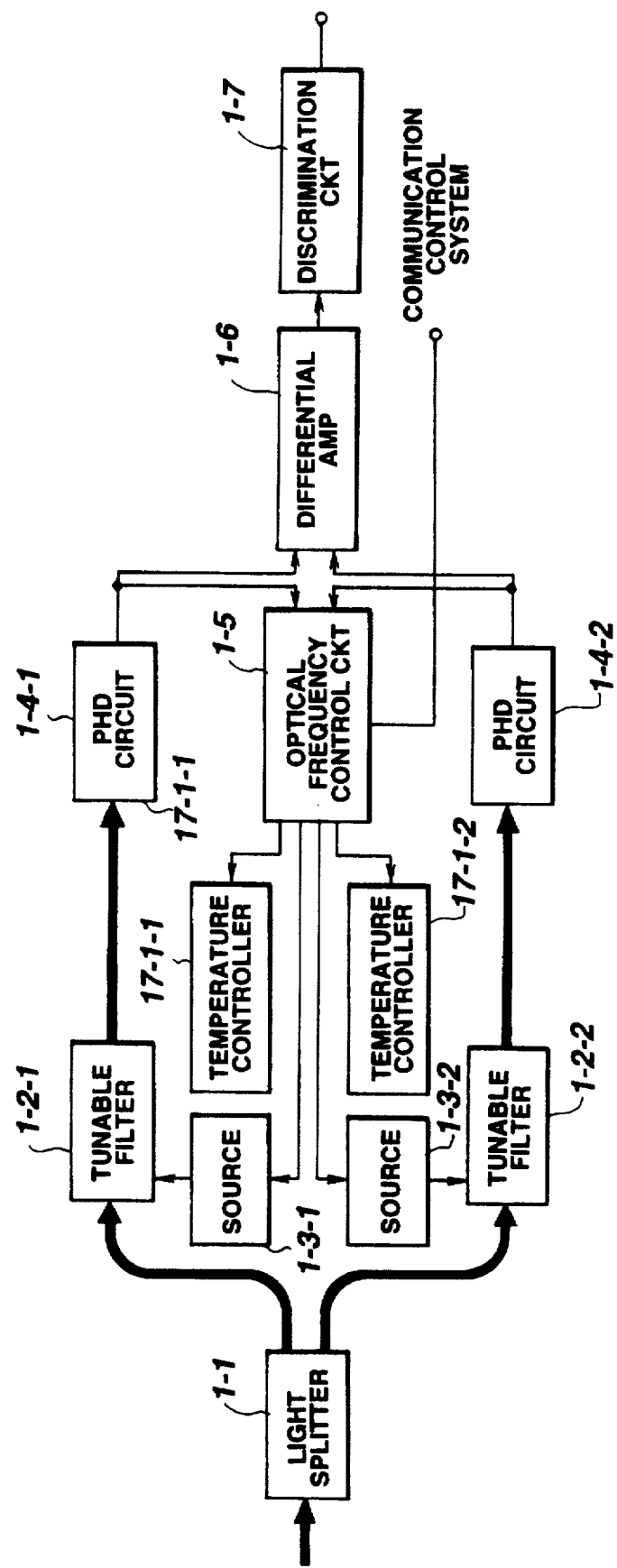
FIG. 21 is a block diagram showing an eighth embodiment and other embodiments of the present invention which is directed to an optical FSK receiver.

FIG. 21 is a block diagram of an eighth embodiment of the present invention, which is directed to an optical FSK receiver.

As controlling means of optical frequencies of the tunable filters 1-2, injection current and temperature are respectively utilized in the first to sixth and the seventh embodiments, but those means can be combined. For example, the optical frequency interval between the tunable filters 1-2 is set by the injection current, and the tracking of center optical frequency ffc of the optical FSK receiver is performed by temperature. Further, the optical frequencies of tunable filters may be controlled by other means.

A difference between the eighth embodiment and the above embodiments is in that the optical frequencies of the tunable filters 1-2 are controlled by temperature, instead of the injection current, and that the modulation of the optical frequencies for producing an error signal is performed by the injection current, similar to the first to sixth embodiments. Therefore, the outputs of the optical frequency control circuit 1-5 are connected to temperature controllers 17-1-1 and 17-1-2 in addition to the current sources 1-3-1 and 1-3-2. As the temperature controllers 17-1-1 and 17-1-2, an apparatus, in which a change in temperature is detected by a thermistor and the temperature is maintained constant by a Peltier device, may be preferably used, similar to the seventh embodiment.

Ninth Embodiment

Figure 22:
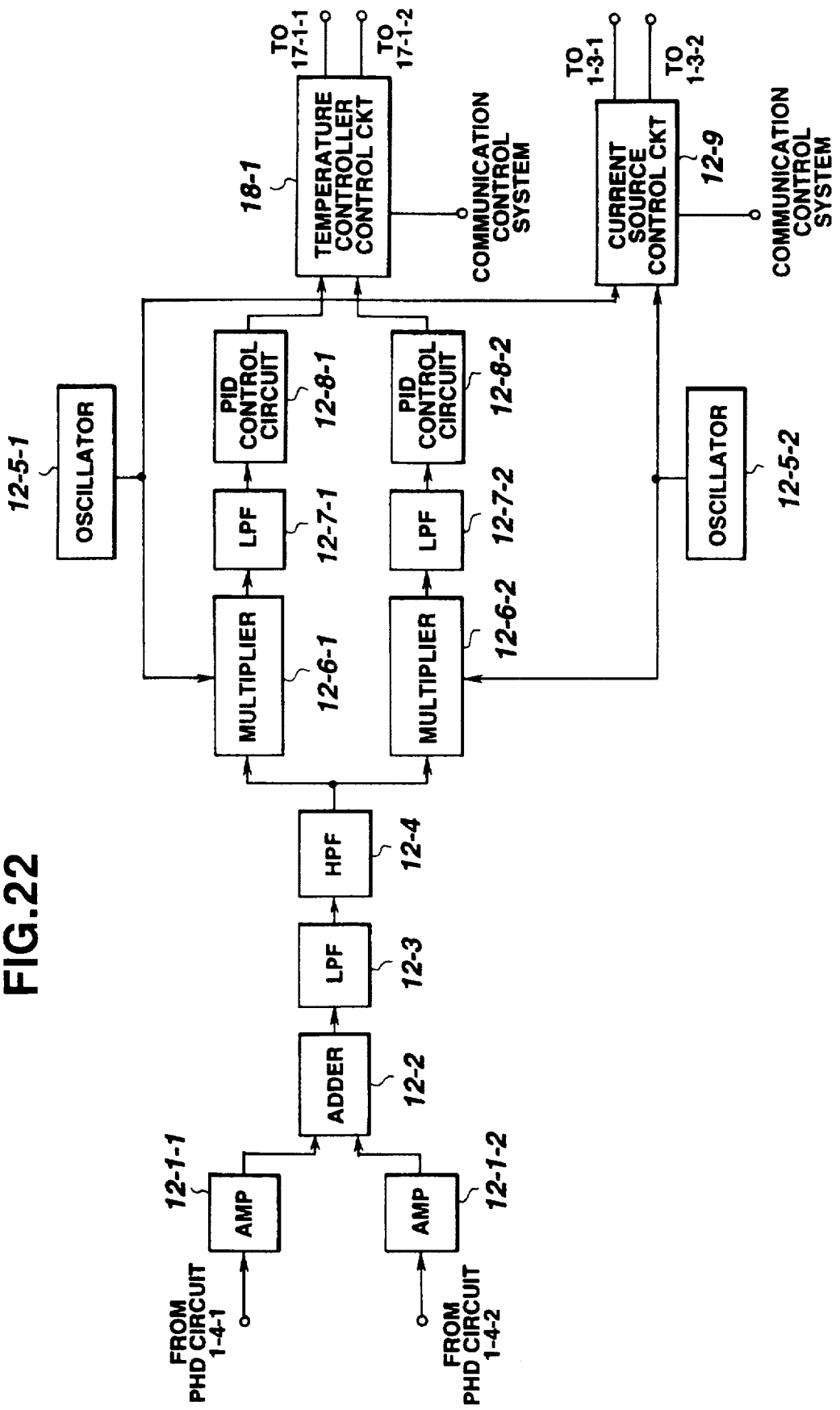
FIG. 22 is a block diagram showing an optical frequency control circuit of an optical FSK receiver of a ninth embodiment of the present invention.

FIG. 22 shows the optical frequency control circuit 1-5 of this embodiment. The ninth embodiment relates to a first example of an optical frequency control circuit of the eighth embodiment that utilizes a temperature-current control method. The basic structure of this embodiment is the same as that of the fifth embodiment shown in FIG. 12. In the ninth embodiment, outputs of PID control circuits 12-8-1 and 12-8-2 are connected to a temperature controller control circuit 18-1, rather than the current source control circuit 12-9.

Other structural elements, operations and the like are substantially the same as those of the fifth embodiment. Since the optical frequency of a DFB filter can also be controlled by temperature as mentioned above, this embodiment also utilizes that characterictic.

Tenth Embodiment

Figure 23:
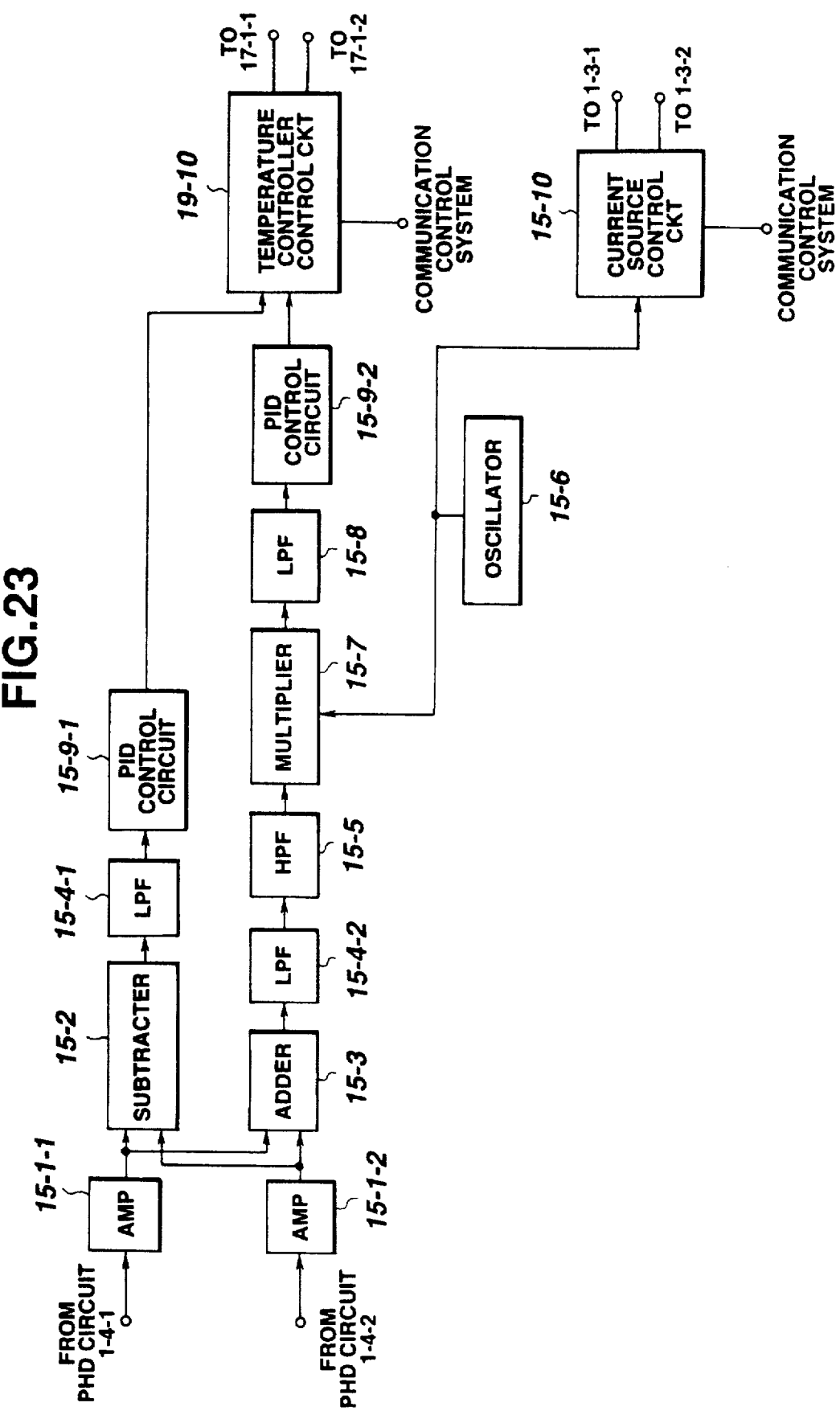
FIG. 23 is a block diagram showing an optical frequency control circuit of an optical FSK receiver of a tenth embodiment of the present invention.

FIG. 23 shows the optical frequency control circuit 1-5 of this embodiment. The tenth embodiment relates to a second example of an optical frequency control circuit of the eighth embodiment that utilizes a temperature-current control method. The basic structure of the tenth embodiment is the same as that of the sixth embodiment shown in FIG. 15. A difference between the tenth embodiment and the sixth embodiment is in that the outputs of PID control circuits 15-9-1 and 15-9-2 are connected to a temperature controller control circuit 19-10, rather than the current source control circuit 15-10. The modulation of the optical frequency for producing an error signal for the tracking of ffd is performed by the injection current, similar to the sixth embodiment.

Other structural elements, operations and the like are substantially the same as those of the sixth embodiment.

Eleventh Embodiment

Figure 24:
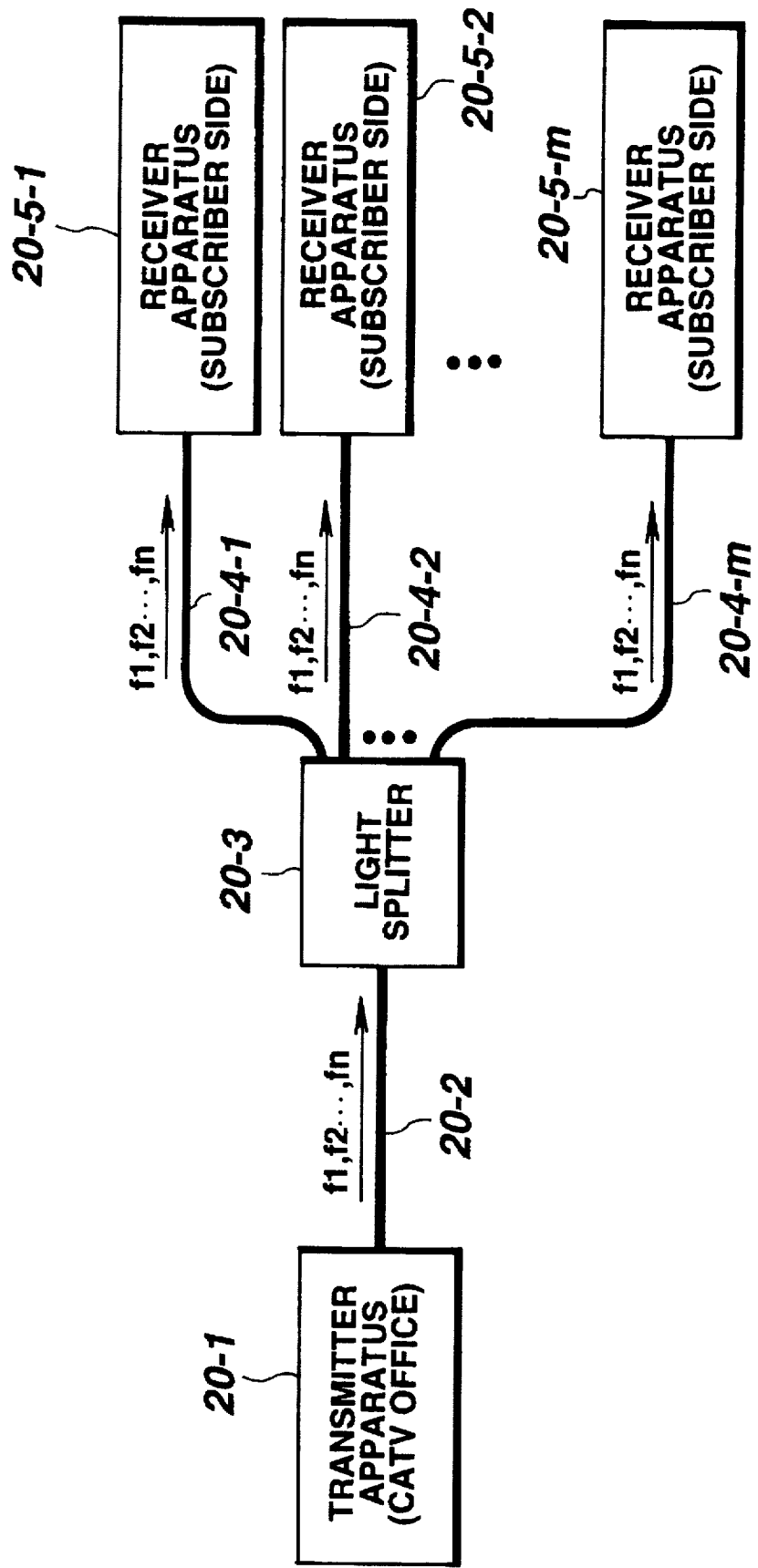
FIG. 24 is a view showing an eleventh embodiment of an optical FDM-FSK transmission system using an optical FSK receiver of the present invention.

An eleventh embodiment according to the present invention, which is directed to an optical FDM-FSK transmission system using an optical FSK receiver of the present invention, will be described with reference to FIG. 24. FIG. 24 is a view of the system structure. The system structure is suitably used for the picture or video distribution and the optical CATV. The number of channels is n, the number of receiver apparatuses is m and optical frequencies of respective channels are indicated by f1, f2, . . . , fn (fs and fm of one channel are designated by f). A receiver apparatus 20-1 on the side of a CATV office directly FSK-modulates n DFB-LDs, and digital video signals are respectively carried on modulated signals which are transmitted to an optical fiber 20-2. The optical signals are respectively divided into m portions to be transmitted in optical fibers 20-4-1~20-4-m by a light splitter 20-3, and they are transmitted to receiver apparatuses on the side of subscribers. The receiver apparatuses 20-5-1~20-5-m respectively include optical FSK receivers of the first embodiment for reproducing a digital video signal of a receiving channel. Tuning, tracking and optical FSK receiving operations of the respective receiver apparatuses 20-5-1~20-5-m are the same as those of the first embodiment.

By using the optical FSK receiver of the present invention, the interval between mark and space optical wavelengths of optical FSK signal of each channel can be narrowed, and the number of multiplexed channels can be increased.

Twelfth Embodiment

Figure 25:
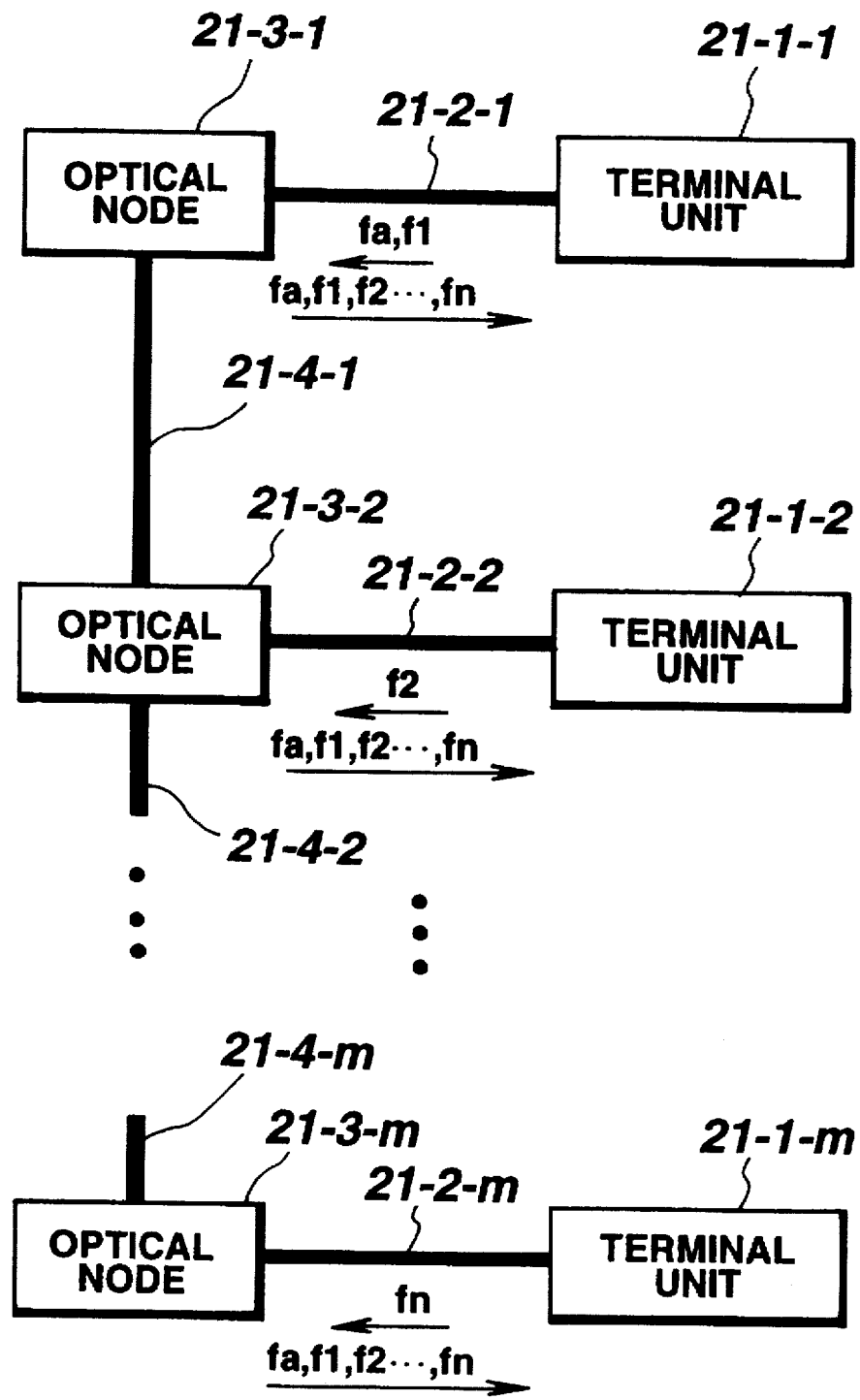
FIG. 25 is a view showing a twelfth embodiment of an optical FDM-FSK transmission system using an optical FSK receiver of the present invention.

A twelfth embodiment according to the present invention, which is directed to an optical FDM-FSK transmission system using an optical FSK receiver of the present invention, will be described with reference to FIG. 25. FIG. 25 is a view of the system structure. The system structure is suitably used for multi-media optical LAN. M terminal units 21-1-1~21-1-m are respectively connected to transmission lines or optical fibers 21-4-1~21-4-m through optical fibers 21-2-1~21-2-m and optical nodes 21-3-1~21-3-m.

In the system of this embodiment, an optical FDM-FSK transmission is used for transmission of signal, such as video signal, which is not suitable for an ordinary packet communication, and a direct modulation-direct detection transmission is used, whose carrier has an optical frequency more than 1 nm remote from an optical signal spectrum of the optical FDM-FSK transmission, for the ordinary packet communication. Hereinafter, the latter is referred to as a first system and the former is referred to as a second system. The optical frequency of the first system is fa, and optical frequencies of the second system are f1~fn. The respective terminal units 21-1-1~21-1-m are provided with transmitter-receiver circuits of the first and second systems. The optical frequency of the transmitter-receiver circuit in the first system is fixed, and the optical frequencies of the transmitter-receiver circuits in the second system are changeable (its changeable range is from f1 to fn). An optical FSK receiver of the first embodiment is used as the receiver circuit in the second system. As an access control system, carrier sense multiple access/collision detection (CSMA/CD) is utilized in the first system, and channel assignment is used in the second system. Communication for controls of channel assignment and so forth in the second system (for example, see the communication control system in the receiver apparatus of the first embodiment) is performed by using the first system. FIG. 25 illustrates a situation in which the terminal unit 21-1-1 conducts light transmissions using the first system (i.e., its optical frequency fa) and f1 of the second system, the terminal unit 21-1-2 conducts light transmission using f2 of the second system, and the terminal unit 21-1-m conducts light transmission using fn of the second system. Tuning, tracking and optical FSK receiving operations of the respective receiver apparatuses 21-1-1~21-1-m of this embodiment are the same as those of the first embodiment.

The following features are not limited to those described in the foregoing embodiments of the present invention.

In the above embodiments, the DFB filter is used as a tunable optical filter, but other semiconductor type filters, such as DBR filter and Fabry-Perot type filter, may be used.

Although the Y-splitter is employed as a light splitter in the second embodiment, other means may be used. For example, an integrated coupler formed by using fine etching technique may be utilized. Further, the DFB filter may be replaced by other semiconductor type filters such as a DBR filter. Moreover, semiconductor type filters, such as a DFB filter, which also have the function of a light receiving element, may be used.

Further, although 1.55 μm band elements are used in the above discussed embodiments, 1.3 μm band or 0.8 μm band GaAs/AlGaAs series elements or portions may be used. In this case, an appropriate optical fiber therefor is used.

Although a bus type topology is used in the twelfth embodiment, a star type may be employed. Further, multiplexing is performed by optical frequency or wavelength multiplexing in which the optical frequencies of the first and second systems is apart from each other, but the first and second systems may be multiplexed by spatial multiplexing using a multi-core fiber. The CSMA/CD is used as a protocol in the first system, but other protocols may be used.

Further, an optical FSK receiver of the present invention may be used in an optical frequency modulation (FM) signal system in which the optical frequency is changed between optical frequencies of two tunable optical filters.

As described in the foregoing, according to the present invention, the tracking object can be only the center optical frequency, so that the tracking of optical FSK receiver can be readily achieved and the structure of the receiver can be simplified. Further, the structure of the present invention is suitable for integration of optical device, and is effective for reducing size and cost of the optical FSK receiver.

Further, according to the optical FSK receiver of the present invention, optical communication, such as optical FDM-FSK transmission system, in which the number of channels is large, receiving characteristics are good, and cost is inexpensive, can be obtained.

Except as otherwise disclosed herein, the various components shown in outline or block form in the Figures are individually well known in the optical receiving device and optical communication arts, and their internal construction and operation are not critical either to the making or using of this invention or to a description of the best mode of the invention.

While the present invention has been described with respect to what is presently considered to be the preferred embodiments, it is to be understood that the invention is not limited to the disclosed embodiments. The present invention is intended to cover various modifications and equivalent arrangements included within the sprit and scope of the appended claims.

What is claimed is:

1. An optical frequency shift keying (FSK) receiver for use in an optical frequency division multiplexing (FDM)-FSK transmission system, said receiver comprising:

light splitting means for splitting an optical FSK signal into at least two light portions;

at least two tunable optical filters, said filters respectively receiving the light portions from said light splitting means and being respectively capable of changing their transmission wavelengths;

at least two light receiving means for receiving lights from said filters, respectively, said light receiving means respectively supplying electrical signal outputs; and producing means for producing a difference signal from the outputs of said light receiving means;

wherein mark and space optical frequencies of one optical FSK signal split by said light splitting means are respectively transmitted through said tunable optical filters whose transmission wavelengths are respectively tuned to the mark and space optical frequencies, the transmitted mark and space optical frequencies are directly and independently received by said light receiving means and the optical FSK signal is received by using the difference signal produced by said producing means.

2. An optical frequency shift keying (FSK) receiver according to claim 1, further comprising optical frequency control means and an optical frequency control circuit, said optical frequency control circuit including a low pass filter for producing a low frequency component of the difference signal and a circuit for controlling said optical frequency control means based on the low frequency component, and wherein a center optical frequency of said tunable optical filters is tracked to a center optical frequency of the received optical FSK signal by said optical frequency control means using the low frequency component as an error signal.

3. An optical frequency shift keying (FSK) receiver according to claim 2, wherein said optical frequency control means comprises current sources for said tunable optical filters.

4. An optical frequency shift keying (FSK) receiver according to claim 2, wherein said optical frequency control means comprises temperature controllers for said tunable optical filters.

5. An optical frequency shift keying (FSK) receiver according to claim 1, further comprising optical frequency control means and an optical frequency control circuit, said optical frequency control circuit including an adder for producing a sum signal of the outputs of said light receiving means, a reference voltage source for supplying a reference voltage, a first low pass filter for producing a first low frequency component of the difference signal, a second low pass filter for producing a second low frequency component of the sum signal, a subtracter for producing a difference signal between the second low frequency component and the reference voltage and a circuit for controlling said optical frequency control means, and wherein a center optical frequency of said tunable optical filters is tracked to a center frequency of the received optical FSK signal by said optical frequency control means using the first low frequency component as an error signal, and an optical frequency interval of said tunable optical filters is tracked to an optical frequency interval of the received optical FSK signal by said optical frequency control means using the second difference signal as an error signal.

6. An optical frequency shift keying (FSK) receiver according to claim 5, wherein said optical frequency control means comprises current sources for said tunable optical filters.

7. An optical frequency shift keying (FSK) receiver according to claim 5, wherein said optical frequency control means comprises temperature controllers for said tunable optical filters.

8. An optical frequency shift keying (FSK) receiver according to claim 1, further comprising optical frequency control means and an optical frequency control circuit, said optical frequency control circuit including an adder for producing a sum signal of the outputs of said light receiving means, at least two modulating means for supplying modulation signals of different frequencies for modulating a center optical frequency and an optical frequency interval of said tunable optical filters, a low pass filter for producing a modulated component of the sum signal, at least two phase detecting means for detecting phase relations between the modulated component and the modulation signals of different frequencies, respectively, and a circuit for controlling said optical frequency control means based on the phase relations, and wherein a center optical frequency of said tunable optical filters is tracked to a center frequency of the received optical FSK signal by said optical frequency control means producing an error signal from the phase relation between the modulated component and the modulation signal of one frequency, and an optical frequency interval of said tunable optical filters is tracked to an optical frequency interval of the received optical FSK signal by said optical frequency control means producing an error signal from the phase relation between the modulated component and the modulation signal of the other frequency.

9. An optical frequency shift keying (FSK) receiver according to claim 8, wherein said optical frequency control means comprises current sources for said tunable optical filters.

10. An optical frequency shift keying (FSK) receiver according to claim 8, wherein said optical frequency control means comprises temperature controllers for said tunable optical filters.

11. An optical frequency shift keying (FSK) receiver according to claim 1, further comprising optical frequency control means and an optical frequency control circuit, said optical frequency control circuit including an adder for producing a sum signal of the outputs of said light receiving means, modulating means for supplying a modulation signal for modulating an optical frequency interval of said tunable optical filters, a low pass filter for producing a low frequency component of the difference signal, a low pass filter for producing a modulated component of the sum signal, phase detecting means for detecting a phase relation between the modulated component and the modulation signal and a circuit for controlling said optical frequency control means, and wherein a center optical frequency of said tunable optical filters is tracked to a center frequency of the received optical FSK signal by said optical frequency control means using the low frequency component as an error signal, and an optical frequency interval of said tunable optical filters is tracked to an optical frequency interval of the received optical FSK signal by said optical frequency control means producing an error signal from the phase relation between the modulated component and the modulation signal.

12. An optical frequency shift keying (FSK) receiver according to claim 11, wherein said optical frequency control means comprises current sources for said tunable optical filters.

13. An optical frequency shift keying (FSK) receiver according to claim 11, wherein said optical frequency control means comprises temperature controllers for said tunable optical filters.

14. An optical frequency shift keying (FSK) receiver according to claim 1, wherein said tunable optical filter comprises a distributed feedback (DFB) type filter.

15. An optical frequency shift keying (FSK) receiver according to claim 1, wherein said tunable optical filter comprises a distributed bragg reflector (DBR) type filter.

16. An optical frequency shift keying (FSK) receiver according to claim 1, wherein said tunable optical filter comprises a distributed feedback (DFB) type filter, and said DFB filter, said light splitting means and a light receiving element of said light receiving means are integrated on a common substrate.

17. An optical frequency shift keying (FSK) receiver according to claim 1, wherein said tunable optical filter comprises a distributed bragg reflector (DBR) type filter, and said DBR filter, said light splitting means and a light receiving element of said light receiving means are integrated on a common substrate.

18. An optical frequency shift keying (FSK) receiver according to claim 1, wherein said tunable optical filter comprises a Fabry-Perot type filter.

19. An optical receiver according to claim 1, further comprising means for tracking a center optical frequency of said tunable filters to a center optical frequency of a received optical FSK signal.

20. An optical receiver according to claim 19, further comprising means for tracking an optical frequency interval of said tunable filters to an optical frequency interval of the received optical FSK signal.

21. An optical frequency shift keying (FSK) receiver according to claim 1, said producing means comprising a differential amplifier.

22. An optical FDM-FSK transmission system for communicating over a light transmission line that transmits signal lights, said system comprising:

(a) signal transmitting means for transmitting an optical FSK signal; and (b) an optical FSK receiver, said receiver comprising:

light splitting means for splitting the optical FSK signal into at least two light portions;

at least two tunable optical filters, said filters respectively receiving the light portions from said light splitting means and respectively comprising means for changing their transmission wavelengths;

at least two light receiving means for receiving lights from said filters, respectively, said light receiving means respectively supplying electrical signal outputs; and producing means for producing a difference signal from the outputs of said light receiving means;

wherein mark and space optical frequencies of one optical FSK signal split by said light splitting means are respectively transmitted through said tunable optical filters whose transmission wavelengths are respectively tuned to the mark and space optical frequencies, the transmitted mark and space optical frequencies are directly and independently received by said light receiving means and the optical FSK signal is received by using the difference signal produced by said producing means.

23. An optical FDM-FSK transmission system according to claim 22, wherein said system is constructed as an optical cable television (CATV) system.

24. An optical FDM-FSK transmission system according to claim 22, wherein said system is constructed as a bus type transmission system.

25. An optical FDM-FSK transmission system according to claim 22, said producing means comprising a differential amplifier.

* * * * *

UNITED STATES PATENT AND TRADEMARK OFFICE
CERTIFICATE OF CORRECTION

PATENT NO. : 5,594,577

DATED : January 14, 1997

INVENTOR(S) : Majima et al.

It is certified that error appears in the above-indentified patent and that said Letters Patent is hereby corrected as shown below:

ON THE TITLE PAGE:

[56] FOREIGN PATENT PUBLICATIONS:

"2096719 6/1990 Japan" should read --2-96719 6/1990 Japan--.

COLUMN 2:

Line 33, "semiconducotr" should read --semiconductor--.

COLUMN 3:

Line 27, "15-24" should read --15-20--; and
Line 47, "amplifier 12-6" should read --amplifier 112-6--.

COLUMN 5:

Line 35, "Circuit." should read --circuit.--; and
Line 58, "frequency" should be deleted.

COLUMN 9:

Line 27, "Of" should read --of--.

COLUMN 11:

Line 18, "formed-with" should read --formed with--.

UNITED STATES PATENT AND TRADEMARK OFFICE
CERTIFICATE OF CORRECTION

PATENT NO.  : 5,594,577

DATED       : January 14, 1997

INVENTOR(S) : Majima et al.

It is certified that error appears in the above-indentified patent and that said Letters Patent is hereby corrected as shown below:

COLUMN 13:

Line 21, "subtracter-2" should read --subtracter 9-2--.

COLUMN 15:

Line 33, "numerals-" should read --numerals--;
    Line 60, "fu2 (f11." should read --fu2 < f11.--; and
    Line 67, "(PIP)" should read --(PID)--.

COLUMN 20:

Line 51, "in-phse," should read --in-phase,--.

COLUMN 21:

Line 4, "116-1-2," should read --16-1-2,--.

UNITED STATES PATENT AND TRADEMARK OFFICE
CERTIFICATE OF CORRECTION

PATENT NO. : 5,594,577
DATED : January 14, 1997
INVENTOR(S) : Majima et al.

It is certified that error appears in the above-indentified patent and that said Letters Patent is hereby corrected as shown below:

<u>COLUMN 23</u>:

Line 62, "sprit" should read --spirit--.

Signed and Sealed this

Second Day of September, 1997

BRUCE LEHMAN

*Attest:*

*Attesting Officer*    *Commissioner of Patents and Trademarks*